(12) United States Patent
Hiro et al.

(10) Patent No.: US 11,865,781 B2
(45) Date of Patent: Jan. 9, 2024

(54) POWDER BED FUSION APPARATUS WITH EVALUATION UNIT AND MULTIPLE STORAGE CONTAINERS

(71) Applicant: Aspect Inc., Tokyo (JP)

(72) Inventors: Henri Hiro, Tokyo (JP); Yoshiki Otsubo, Tokyo (JP)

(73) Assignee: Aspect Inc., Tokyo (JP)

( * ) Notice: Subject to any disclaimer, the term of this patent is extended or adjusted under 35 U.S.C. 154(b) by 0 days.

(21) Appl. No.: 17/855,178

(22) Filed: Jun. 30, 2022

(65) Prior Publication Data

US 2023/0008559 A1 Jan. 12, 2023

(30) Foreign Application Priority Data

Jul. 8, 2021 (JP) ................................ 2021-113668

(51) Int. Cl.
*B29C 64/255* (2017.01)
*B29C 64/153* (2017.01)
(Continued)

(52) U.S. Cl.
CPC .......... *B29C 64/255* (2017.08); *B29C 64/153* (2017.08); *B29C 64/218* (2017.08);
(Continued)

(58) Field of Classification Search
CPC ... B29C 64/255; B29C 64/153; B29C 64/218; B29C 64/232; B29C 64/268;
(Continued)

(56) References Cited

U.S. PATENT DOCUMENTS

2021/0008795 A1 1/2021 Hagiwara et al.
2021/0162505 A1 6/2021 Narita et al.

FOREIGN PATENT DOCUMENTS

CN 107900329 A * 4/2018 .............. B22F 3/003
JP 2019-177503 A 10/2019
(Continued)

OTHER PUBLICATIONS

CN-107900329-A translation (Year: 2023).*

*Primary Examiner* — Xiao S Zhao
*Assistant Examiner* — Guy F Mongelli
(74) *Attorney, Agent, or Firm* — Fitch, Even, Tabin & Flannery LLP

(57) ABSTRACT

A powder bed fusion apparatus according to an embodiment includes: a fabrication container that is provided between first and second storage containers which heat a powder material stored therein to first and second predetermined temperatures, respectively, and that heats the powder material stored therein to a third predetermined temperature higher than the first and second predetermined temperatures, and lets the powder material be irradiated with a laser beam from a laser beam emission unit based on a model to be fabricated; and an evaluation unit that, when the powder material in the first storage container is carried into the fabrication container, evaluates the carrying based on a comparison between a threshold value and a change in the temperature of the powder material stored in the second storage container calculated based on the temperature detected by a temperature measurement device.

7 Claims, 34 Drawing Sheets

(51) Int. Cl.
  *B29C 64/268* (2017.01)
  *B29C 64/232* (2017.01)
  *B33Y 50/02* (2015.01)
  *B29C 64/218* (2017.01)
  *B29C 64/393* (2017.01)
  *B29C 64/321* (2017.01)
  *B33Y 30/00* (2015.01)
  *B29C 64/295* (2017.01)

(52) U.S. Cl.
  CPC .......... *B29C 64/232* (2017.08); *B29C 64/268* (2017.08); *B29C 64/295* (2017.08); *B29C 64/321* (2017.08); *B29C 64/393* (2017.08); *B33Y 30/00* (2014.12); *B33Y 50/02* (2014.12)

(58) Field of Classification Search
  CPC ... B29C 64/295; B29C 64/321; B29C 64/393; B29C 64/205; B33Y 30/00; B33Y 50/02; B22F 10/28; B22F 10/37; B22F 12/13; B22F 12/17; Y02P 10/25
  See application file for complete search history.

(56) References Cited

FOREIGN PATENT DOCUMENTS

WO  WO-2016168172 A1 * 10/2016  .............. B22F 10/20
WO     2019030839 A1    2/2019

* cited by examiner

POWDER BED FUSION APPARATUS WITH EVALUATION UNIT AND MULTIPLE STORAGE CONTAINERS

CROSS-REFERENCE TO RELATED APPLICATION

This application claims priority to Japanese Patent Application No. 2021-113668, filed Jul. 8, 2021, the entire contents of which are incorporated herein by reference.

BACKGROUND

Technical Field

The present disclosure relates to a powder bed fusion apparatus and a carrying evaluation method therefor.

Background Art

A three-dimensional additive manufacturing technique for manufacturing a three-dimensional model via additive manufacturing involving irradiating a powder material laid in the form of a layer with a beam has been known. Japanese Patent Application Publication No. 2019-177503 (Patent Literature 1) discloses a powder bed fusion apparatus as an example of apparatuses implementing this technique. The apparatus of Patent Literature 1 includes two storage containers storing a powder material, a fabrication container provided therebetween, a recoater to be repetitively moved over the storage containers to carry and supply the powder material into the fabrication container, and a laser beam emission unit that irradiates the powder material in the fabrication container with a laser beam based on a model to be fabricated.

In the three-dimensional additive manufacturing technique, formation of a layer of the powder material, i.e., a thin layer, and irradiation of this thin layer with a light beam according to the shape of a slice of the model to be fabricated are repeated for a plurality of layers. In this way, the model can be obtained. However, if, for example, a thin layer is unevenly formed, simply repeating the thin layer formation and the light beam irradiation in that state may result in a model with a defect. To address such a case, it is desired to promptly detect abnormality occurring during a modeling operation and carry out a fixing operation in real time. International Publication No. WO 2019/030839 (Patent Literature 2) discloses an example of this method.

In the method of Patent Literature 2, after formation of a powder bed, i.e., a thin layer, a shape measurement sensor monitors unevenness on the thin layer.

If the shape measurement sensor detects unevenness with a non-allowable size, the powder is re-laid to reduce the unevenness before the thin layer is irradiated with a light beam.

SUMMARY

The above method of Patent Literature 2 detects the occurrence of abnormality such as a defect on a formed thin layer and handles it. Such a defect or the like may occur due to a shortage of the powder material to be supplied to form the thin layer.

Powder bed fusion apparatuses in recent years accurately form a layer of a powder material with known data on the shrinkage of a solidified region by light beam irradiation and so on taken into account. Here, the shrinkage of a solidified region by light beam irradiation may be within an allowable range but, if such shrinkage consecutively occurs on a plurality of layers, it may cause an unignorable change in the amount of the powder material necessary for the layer formation.

An object of the present disclosure is to provide a configuration with which, when a powder bed fusion apparatus sequentially forms layers of a powder material one over another to manufacture a model, a sign of abnormality in any of the layers can be precisely detected before that abnormality occurs.

A first aspect of disclosed technique provides a powder bed fusion apparatus including: a first storage container that includes a first table disposed so as to be capable of being raised and lowered, and heats a powder material stored on the first table to a first predetermined temperature; a second storage container that includes a second table disposed so as to be capable of being raised and lowered, and heats the powder material stored on the second table to a second predetermined temperature; a fabrication container that is provided between the first storage container and the second storage container, includes a modeling table which is disposed so as to be capable of being raised and lowered and on which a model is to be fabricated using the powder material, heats the powder material on the modeling table to a third predetermined temperature different from the first predetermined temperature and also different from the second predetermined temperature, and lets the powder material on the modeling table be irradiated with a laser beam from a laser beam emission unit based on the model to be fabricated; a recoater that is provided so as to be capable of moving over the first storage container and over the second storage container to carry the powder material; a carrying control unit that controls raising and lowering of each of the first table, the second table, and the modeling table and movement of the recoater when the powder material is carried into the fabrication container; a first temperature measurement device that is provided so as to detect a temperature of the powder material stored in the second storage container; and an evaluation unit that, when the powder material in the first storage container is carried into the fabrication container, evaluates the carrying of the powder material based on the temperature of the powder material stored in the second storage container detected by the first temperature measurement device.

Preferably, the first predetermined temperature is a temperature lower than the third predetermined temperature, and the second predetermined temperature is a temperature lower than the third predetermined temperature. The first temperature measurement device may be a non-contact temperature measurement device.

Preferably, the above-described powder bed fusion apparatus further includes an amount calculation unit that changes an amount of the powder material to be carried into the fabrication container based on a comparison between the temperature of the powder material stored in the second storage container detected by the first temperature measurement device and a threshold value by the evaluation unit.

Preferably, when the evaluation unit indicates that a change in the temperature of the powder material stored in the second storage container is less than or equal to a first threshold value, the amount calculation unit increases an amount of the powder material to be carried into the fabrication container by moving the recoater from the second storage container side to the first storage container side or an amount of the powder material to be carried into the fabrication container by moving the recoater from the first storage container side to the second storage container side by a first predetermined amount from a first reference value.

Preferably, the above-described powder bed fusion apparatus further includes a second temperature measurement device that is provided so as to detect a temperature of the powder material stored in the first storage container. In this case, when the powder material in the second storage container is carried into the fabrication container, the evaluation unit preferably evaluates the carrying of the powder material based on a comparison between a change in the temperature of the powder material stored in the first storage container detected by the second temperature measurement device and a second threshold value. Further, when the evaluation unit indicates that the change in the temperature of the powder material stored in the first storage container is less than or equal to the second threshold value, the amount calculation unit preferably increases an amount of the powder material to be carried into the fabrication container by moving the recoater from the first storage container side to the second storage container side or an amount of the powder material to be carried into the fabrication container by moving the recoater from the second storage container side to the first storage container side by a second predetermined amount from a second reference value. The second reference value may be equal to or different from the first reference value mentioned earlier. Moreover, the second predetermined amount may be equal to or different from the first predetermined amount mentioned earlier.

A second aspect of disclosed technique provides a method of evaluating carrying of a powder material in a powder bed fusion apparatus including a first storage container that includes a first table disposed so as to be capable of being raised and lowered, and heats the powder material stored on the first table to a first predetermined temperature, a second storage container that includes a second table disposed so as to be capable of being raised and lowered, and heats the powder material stored on the second table to a second predetermined temperature, a fabrication container that is provided between the first storage container and the second storage container, includes a modeling table which is disposed so as to be capable of being raised and lowered and on which a model is to be fabricated using the powder material, heats the powder material to a third predetermined temperature different from the first predetermined temperature and also different from the second predetermined temperature, and lets the powder material on the modeling table be irradiated with a laser beam from a laser beam emission unit based on the model to be fabricated, a recoater that is provided so as to be capable of moving over the first storage container and over the second storage container to carry the powder material, and a carrying control unit that controls raising and lowering of each of the first table, the second table, and the modeling table and movement of the recoater when the powder material is carried into the fabrication container, the carrying evaluation method including: detecting a temperature of the powder material stored in the second storage container by using a non-contact temperature measurement device when the recoater moves from the first storage container side toward the second storage container side to carry the powder material in the first storage container into the fabrication container; and evaluating the carrying of the powder material into the fabrication container based on a comparison between the detected temperature and a threshold value.

Preferably, in the above-mentioned carrying evaluation method, the first predetermined temperature is a temperature lower than the third predetermined temperature, and the second predetermined temperature is a temperature lower than the third predetermined temperature.

Preferably, the above-mentioned carrying evaluation method further includes, if determining that a change in the temperature of the powder material stored in the second storage container is less than or equal to the threshold value, increasing an amount of the powder material to be carried into the fabrication container by moving the recoater from the second storage container side to the first storage container side or an amount of the powder material to be carried into the fabrication container by moving the recoater from the first storage container side to the second storage container side by a predetermined amount from a reference value.

According to the first and second aspects described above, when a powder bed fusion apparatus sequentially forms layers of a powder material one over another to manufacture a model, a sign of abnormality in any of the layers can be precisely detected before that abnormality occurs.

DETAILED DESCRIPTION

Hereinbelow, an embodiment according to the present disclosure will be described based on the accompanying drawings. Identical parts (or components) are denoted by the same reference sign, and have the same name and function as well. Thus, detailed description of these parts (or components) will not be repeated.

A powder bed fusion apparatus 1 according to an embodiment of the present disclosure will be described below.

Figure 1:
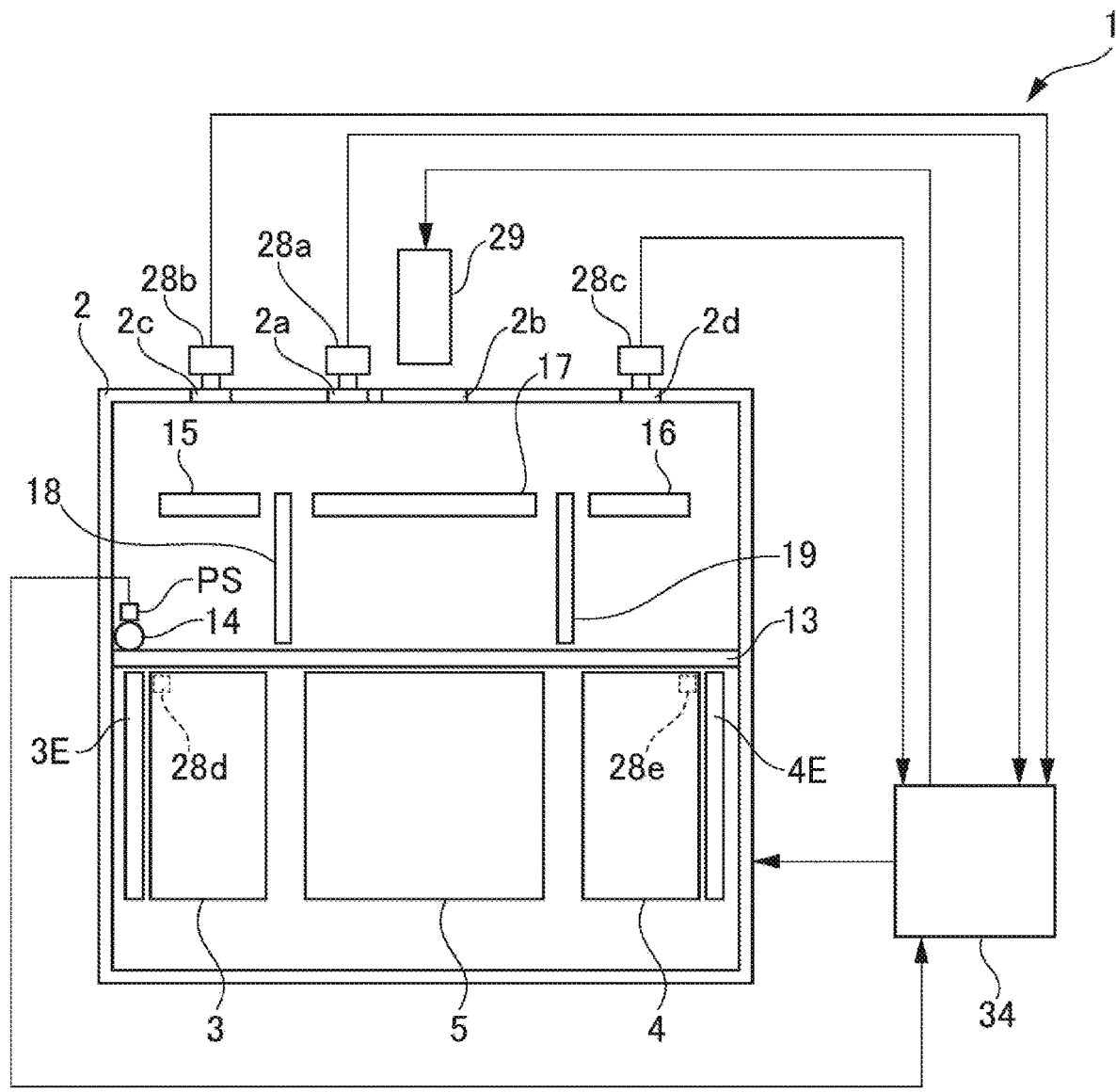
FIG. 1 is a diagram describing an example configuration of a powder bed fusion apparatus according to an embodiment of the present disclosure.
Figure 2:
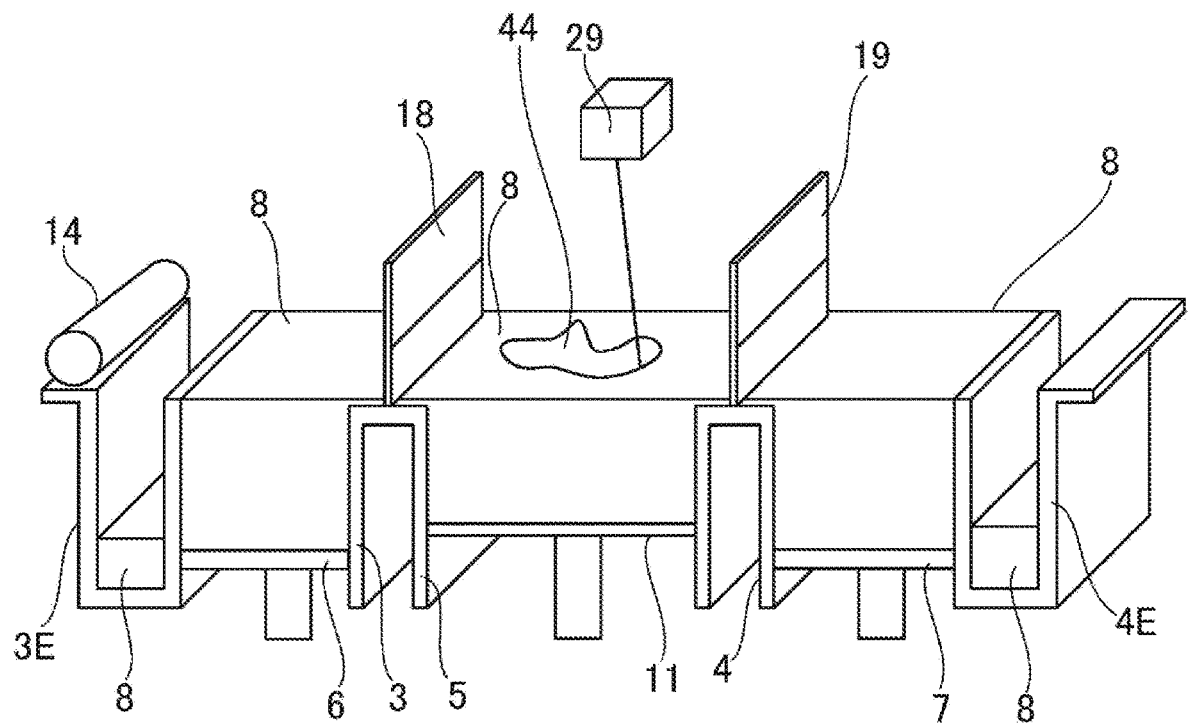
FIG. 2 is a perspective view of main components of the powder bed fusion apparatus in FIG. 1 for conveying and supplying a powder material.

FIG. 1 is a diagram illustrating a schematic configuration of the powder bed fusion apparatus 1. Moreover, FIG. 2 is a perspective view of main components of the powder bed fusion apparatus 1 for supplying a powder material. Furthermore, FIG. 3 is a top view illustrating components of the powder bed fusion apparatus excluding its housing, and FIG. 4 is a cross-sectional view taken along IV-IV line in FIG. 3 with some components at opposite ends omitted.

As illustrated in FIG. 1, the powder bed fusion apparatus 1 accommodates, within its housing 2, two storage containers 3 and 4 storing a powder material, and a fabrication container 5 in which a model 44 is to be fabricated using the powder material in the storage containers 3 and 4. The fabrication container 5 is positioned between the storage containers 3 and 4 to be sandwiched between the storage containers 3 and 4. Note that the storage containers 3 and 4 correspond respectively to first and second storage containers, but the combination may be reversed.

The kind of powder material to be used is not particularly limited. Examples of usable powder materials include powders of thermoplastic resins such as polyphenylene sulfide (PPS), polybutylene terephthalate (PBT), polyamides (PAs) such as nylon 6, nylon 11, and nylon 12 (nylon is a registered trademark), polypropylene (PP), elastomers (ELs), and the like.

Figure 3:
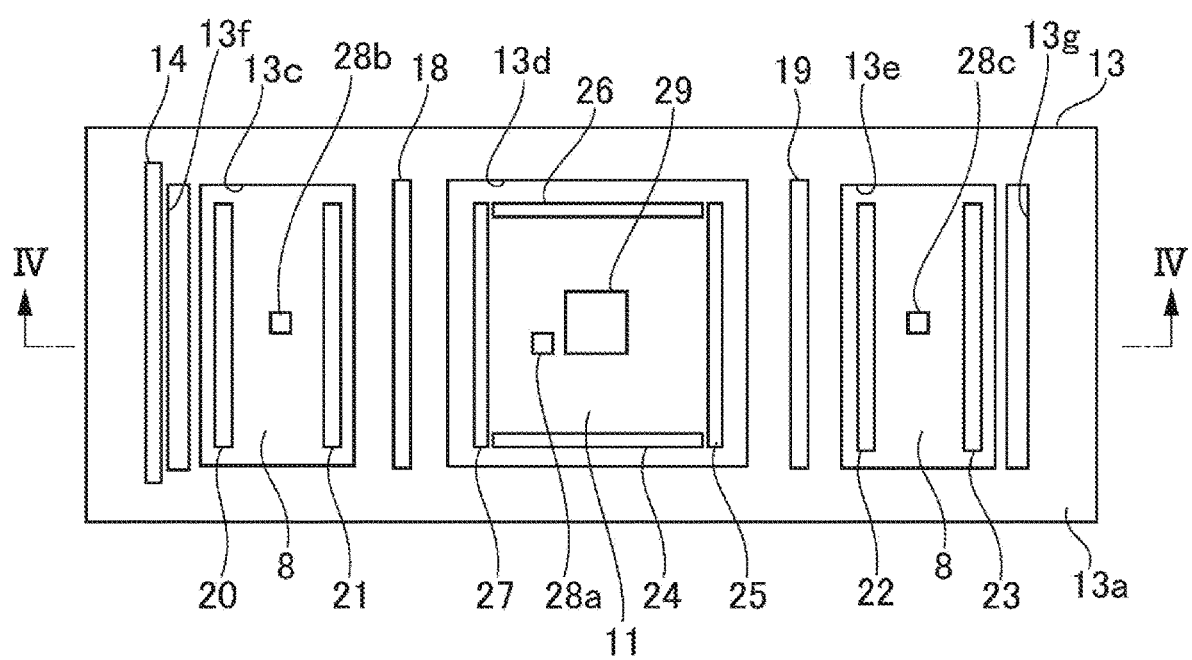
FIG. 3 is a top view illustrating components of the powder bed fusion apparatus excluding its housing.
Figure 4:
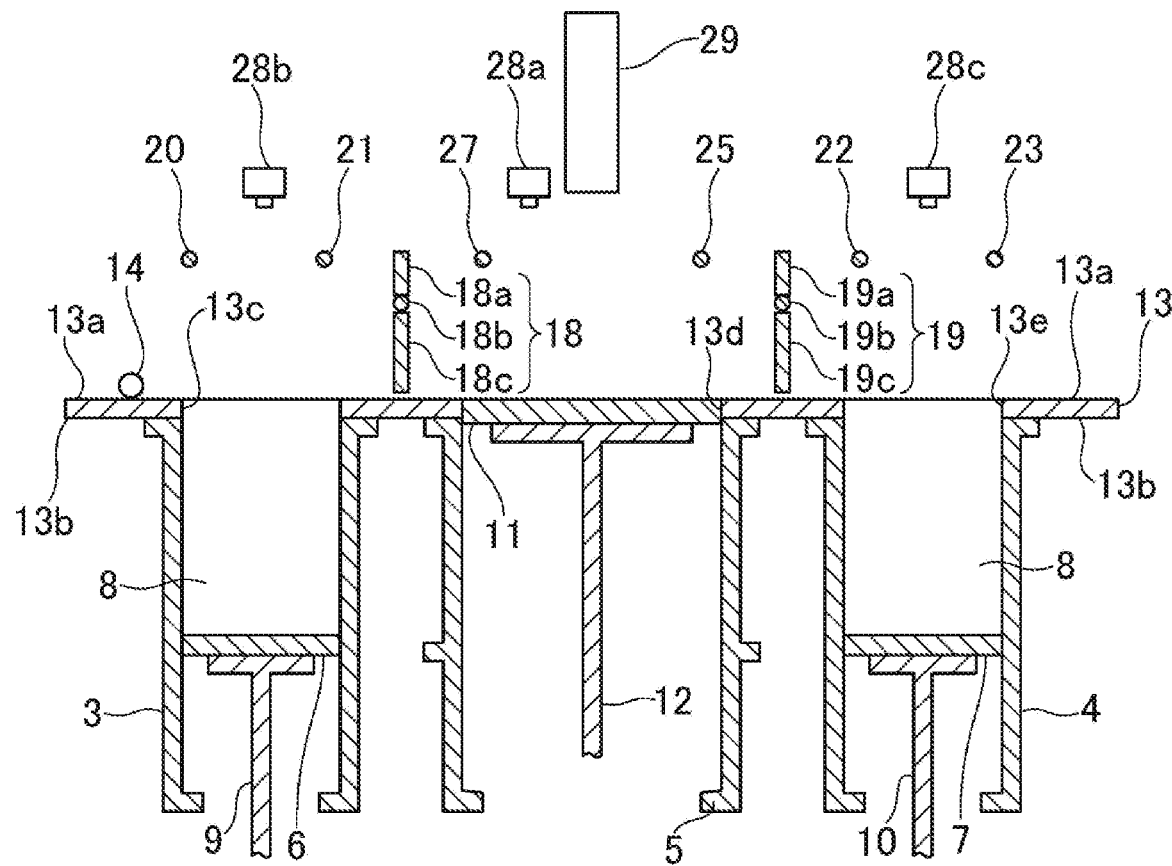
FIG. 4 is a cross-sectional view taken along IV-IV line in FIG. 3 with some parts omitted.

As illustrated in FIG. 3, of these containers 3 to 5, the storage containers 3 and 4 are each a tubular container formed by performing processes such as bending and welding on a steel sheet, for example, the container having a rectangular opening as viewed from above.

Supply tables 6 and 7 are disposed inside the storage containers 3 and 4, respectively. A powder material 8 is externally supplied onto these supply tables 6 and 7. Support rods 9 and 10 connected to drivers not illustrated are attached to the lower surfaces of the supply tables 6 and 7. As these drivers drive the support rods 9 and 10, the supply tables 6 and 7 are raised or lowered inside the storage containers 3 and 4 via the support rods 9 and 10.

The fabrication container 5 is a tubular container formed by performing processes such as bending and welding on a steel sheet, for example, the container having a rectangular opening and, in the present embodiment, a square opening as viewed from above.

A modeling table 11 is disposed inside the fabrication container 5. The powder material 8 in the storage containers 3 and 4 will be supplied onto this modeling table 11. A support rod 12 connected to a driver not illustrated is attached to the lower surface of the modeling table 11. As this driver drives the support rod 12, the modeling table 11 is raised or lowered inside the fabrication container 5 via the support rod 12.

As illustrated in FIG. 1, the powder bed fusion apparatus 1 further accommodates reservoir containers 3E and 4E within its housing 2. The reservoir containers 3E and 4E are provided to store portions of the powder material 8 fed in excess. The reservoir containers 3E and 4E are each referred to also as an excess powder cartridge (EPC). The reservoir container 3E is provided next to the storage container 3, in particular, on its outer side. The reservoir container 4E is provided next to the storage container 4, in particular, on its outer side. The reservoir containers 3E and 4E are positioned on the sides of the containers 3 to 5 so that the containers 3 to 5 are sandwiched between the reservoir containers 3E and 4E.

The reservoir containers 3E and 4E are each a container formed by performing processes such as bending and welding on a steel sheet, for example, the container having a rectangular opening as viewed from above.

A carrying plate 13 is installed on the storage containers 3 and 4, the fabrication container 5, and the reservoir containers 3E and 4E. A recoater 14 is provided on this carrying plate 13.

The carrying plate 13 is a steel sheet with a flat upper surface 13a and lower surface 13b, and is provided with through-holes 13c to 13e for the containers 3 to 5 and through-holes 13f and 13g for the reservoir containers 3E and 4E. Note that illustration of the reservoir containers 3E and 4E and the through-holes 13f and 13g is omitted in FIG. 4.

These through-holes 13c to 13g have shapes and sizes corresponding to the openings at or the shapes of the tops of the respective containers 3 to 5, 3E, and 4E. Thus, in one example, the through-hole 13c, the through-hole 13d, and the through-hole 13*e* communicate with the top opening of the storage container 3, the top opening of the fabrication container 5, and the top opening of the storage container 4, respectively.

As illustrated in FIG. 2, the recoater 14 includes a roller and is connected to a driver not illustrated. As this driver drives the recoater 14, the recoater 14 can be moved leftward or rightward on the upper surface 13*a* of the carrying plate 13, i.e., over the storage container 3 and over the storage container 4. As illustrated in FIGS. 1 to 3, the range of this movement of the recoater 14 covers all of the opening portions of the reservoir container 3E, the storage container 3, the fabrication container 5, the storage container 4, and the reservoir container 4E. Note that the recoater 14 may be a different component such as a plate-shaped member, e.g., a narrow metal plate.

When forming a layer of the powder material 8, i.e., a thin layer, in the fabrication container 5, the powder bed fusion apparatus 1 raises and lowers the supply tables 6 and 7 and the modeling table 11 and moves the recoater 14 leftward or rightward. As a result, the powder material 8 in the storage container 3 or 4 is carried into the fabrication container 5 via the upper surface 13*a* of the carrying plate 13 and the through-holes 13*c* to 13*e*. This is how the powder material 8 in the storage containers 3 or 4 is supplied to the fabrication container 5. Note that an excess portion of the powder material 8 that could not be stored in the containers 3 to 5 reaches and enters the reservoir container 3E or 4E with the movement of the recoater 14 and is held therein.

Thus, it can be said that the storage containers 3 and 4, the supply tables 6 and 7, the carrying plate 13, and the recoater 14 mainly form a unit for supplying the powder material 8 (resin material supply unit).

As illustrated in FIG. 1, upper heating units 15 to 17 and reflection plates 18 and 19 are provided in a space above the carrying plate 13 inside the housing 2.

As illustrated in FIGS. 3 and 4, of the upper heating units 15 to 17, the upper heating unit 15 is disposed above the storage container 3 and includes two rod-shaped heaters 20 and 21. The upper heating unit 16 is disposed above the storage container 4 and includes two rod-shaped heaters 22 and 23.

These heaters 20 to 23 are infrared heaters or electric resistance heaters and are disposed inward of the longitudinal sides of the storage containers 3 and 4 in parallel to these sides, respectively, as viewed from above. The heaters 20 to 23 heat the powder material 8 on the supply tables 6 and 7 of the storage containers 3 and 4 from above.

The upper heating unit 17 is disposed above the fabrication container 5 and includes four rod-shaped heaters 24 to 27.

These heaters 24 to 27 are infrared heaters or electric resistance heaters and are disposed inward of all the sides of the fabrication container 5 in parallel to these sides, respectively, as viewed from above. These heat the powder material 8 on the modeling table 11 of the fabrication container 5 from above.

The reflection plates 18 and 19 are metal plates attached to support columns not illustrated inside the housing 2 and standing in a vertical direction relative to the upper surface 13*a* of the carrying plate 13. They are disposed between the storage container 3 and the fabrication container 5 and between the fabrication container 5 and the storage container 4, respectively.

Also, in FIGS. 3 and 4, the surface of the left reflection plate 18 on the fabrication container 5 side (right surface) has been mirror-finished, and the surface of the right reflection plate 19 on the fabrication container 5 side (left surface) has been mirror-finished.

In this way, the reflection plates 18 and 19 can reflect heat (infrared rays) from the heaters 24 to 27 and hence heat the powder material 8 in the fabrication container 5 more effectively. This enables the upper heating unit 17 to consume less energy to heat the powder material 8 in the fabrication container 5 to a predetermined temperature and maintain that temperature.

Also, the reflection plates 18 and 19 includes upper parts 18*a* and 19*a* fixed to the above-mentioned support columns inside the housing 2, and lower parts 18*c* and 19*c* connected to the upper parts 18*a* and 19*a* by hinges 18*b* and 19*b* and being swingable in the left-right direction. This structure of the reflection plates 18 and 19 enables the recoater 14 to pass the reflection plates 18 and 19 via the lower parts 18*c* and 19*c*.

Though not illustrated, the powder bed fusion apparatus 1 is also provided with heating units other than the upper heating units 15 to 17.

For example, the fabrication container 5 is provided on its sides with a side heating unit that laterally heats the powder material 8 in the fabrication container 5. Moreover, between the modeling table 11 and the support rod 12 is provided a lower heating unit that heats the powder material 8 in the fabrication container 5 from below. Furthermore, at the lower surface 13*b* of the carrying plate 13 is provided a carrying plate heating unit that heats the powder material 8 in contact with the carrying plate 13. Each of these heating units includes a plate-shaped resistance heating-type heater equipped with a temperature sensor.

The above-described storage containers 3 and 4, fabrication container 5, reservoir containers 3E and 4E, carrying plate 13, recoater 14, upper heating units 15 to 17, reflection plates 18 and 19, and so on are disposed in the housing 2.

In the top of the housing 2, on the other hand, four glass windows 2*a*, 2*b*, 2*c*, and 2*d* are embedded, as illustrated in FIG. 1. Of these windows 2*a* to 2*d*, the window 2*a* is provided with a temperature detection unit 28*a* thereabove, the window 2*c* is provided with a temperature detection unit 28*b* thereabove, and the window 2*d* is provided with a temperature detection unit 28*c* thereabove.

Each of the temperature detection units 28*a*, 28*b*, and 28*c* is a device that detects temperature by means of infrared rays and is in particular an infrared sensor (IR sensor) in the present embodiment. In other words, each of the temperature detection units 28*a*, 28*b*, and 28*c* is a non-contact temperature detection device. The temperature detection unit 28*a* is disposed within the sides of the fabrication container 5 as viewed from above. The temperature detection unit 28*b* is disposed within the sides of the storage container 3 and, in the present embodiment, at a substantially center position as viewed from above. The temperature detection unit 28*c* is disposed within the sides of the storage container 4 and, in the present embodiment, at a substantially center position as viewed from above. Thus, the temperature detection unit 28*a* is capable of detecting the surface temperature of the powder material 8 in the through-hole 13*d* in the carrying plate 13 communicating with the opening of the fabrication container 5. The temperature detection unit 28*b* is capable of detecting the surface temperature of the powder material 8 in the through-hole 13*c* in the carrying plate 13 communicating with the opening of the storage container 3. The temperature detection unit 28*c* is capable of detecting the surface temperature of the powder material 8 in the through-hole 13e in the carrying plate 13 communicating with the opening of the storage container 4.

Note that a plurality of temperature detection units may be additionally prepared and disposed at mutually different positions within the sides of the fabrication container 5 as viewed from above. This enables more accurate detection of the surface temperature of the powder material 8. The above also applies to each of the storage containers 3 and 4.

Note that the remaining window 2b is provided with a laser beam emission unit 29 thereabove.

The laser beam emission unit 29 is a device that emits and scans a laser beam, and is disposed within the sides of the fabrication container 5 as viewed from above. This laser beam emission unit 29 is configured as follows.

Figure 5:
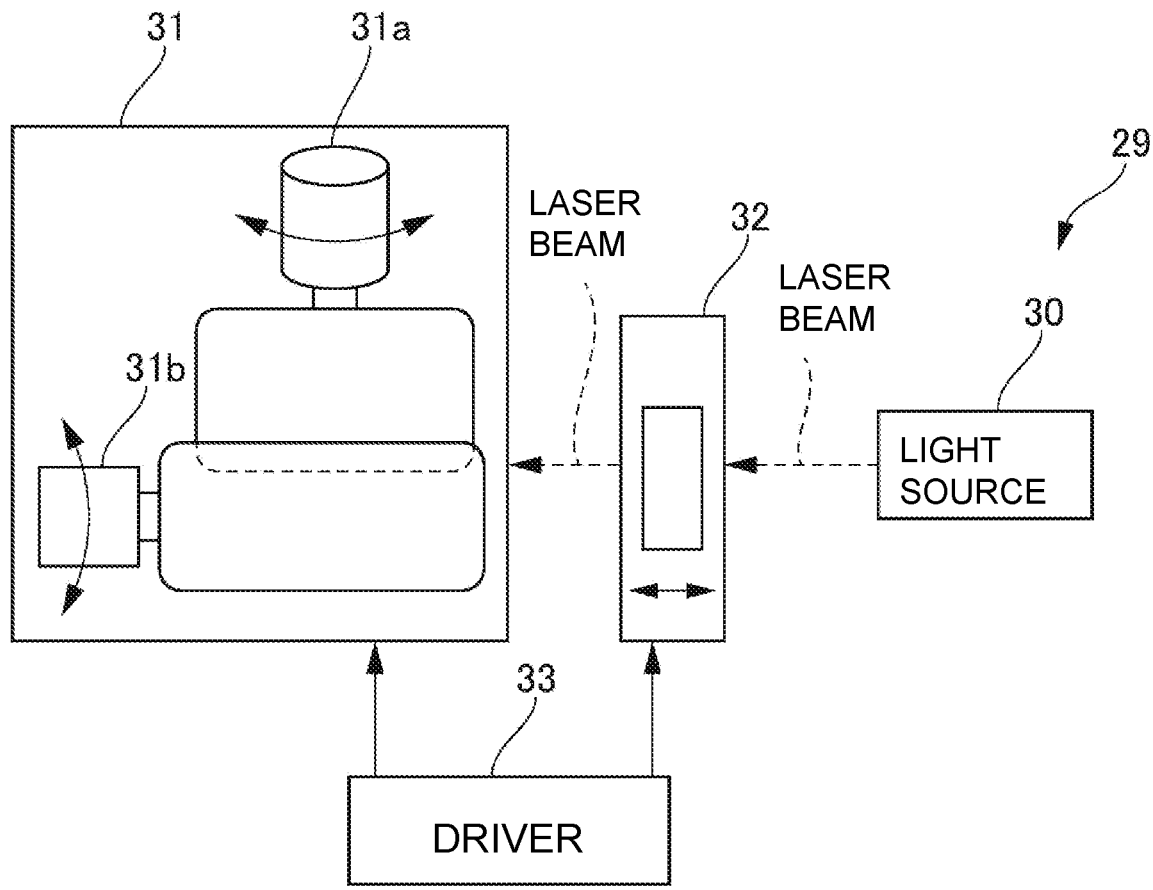
FIG. 5 is a block diagram describing a configuration of a laser beam emission unit.

FIG. 5 is a block diagram describing a configuration of the laser beam emission unit 29. As illustrated in FIG. 5, the laser beam emission unit 29 includes a light source 30, a mirror 31, a lens 32, and a driver 33. Of these parts 30 to 33, the light source 30 is a $CO_2$ laser light source that emits a laser beam with a wavelength of 10.6 μm, for example. Note that the light source 30 is not limited to a $CO_2$ laser light source and may be a fiber laser light source that emits a laser beam with a wavelength of 1.07 μm, for example.

The mirror 31 has a galvanometer mirror as an X mirror 31a and a galvanometer mirror as a Y mirror 31b and changes the angle of a laser beam emitted from the light source 30 by changing the angles of the X mirror 31a and the Y mirror 31b.

The lens 32 changes the focal length of the laser beam emitted from the light source 30 by moving according to the movement of the laser beam.

The driver 33 changes the angles of the X mirror 31a and the Y mirror 31b and moves the lens 32.

In the laser beam emission unit 29, the laser beam emitted from the light source 30 passes the lens 32, the X mirror 31a, and the Y mirror 31b in this order. At this time, the driver 33 drives the X mirror 31a and the Y mirror 31b to change their angles such that the laser beam is scanned in the X direction and the Y direction and applied to a specific region of the surface of the powder material 8 in the through-hole 13d, i.e., the powder material 8 in the fabrication container 5. Furthermore, the driver 33 drives the lens 32 to move it such that the laser beam is focused on the surface of the powder material 8 in the fabrication container 5, i.e., a modeling surface.

Figure 6:
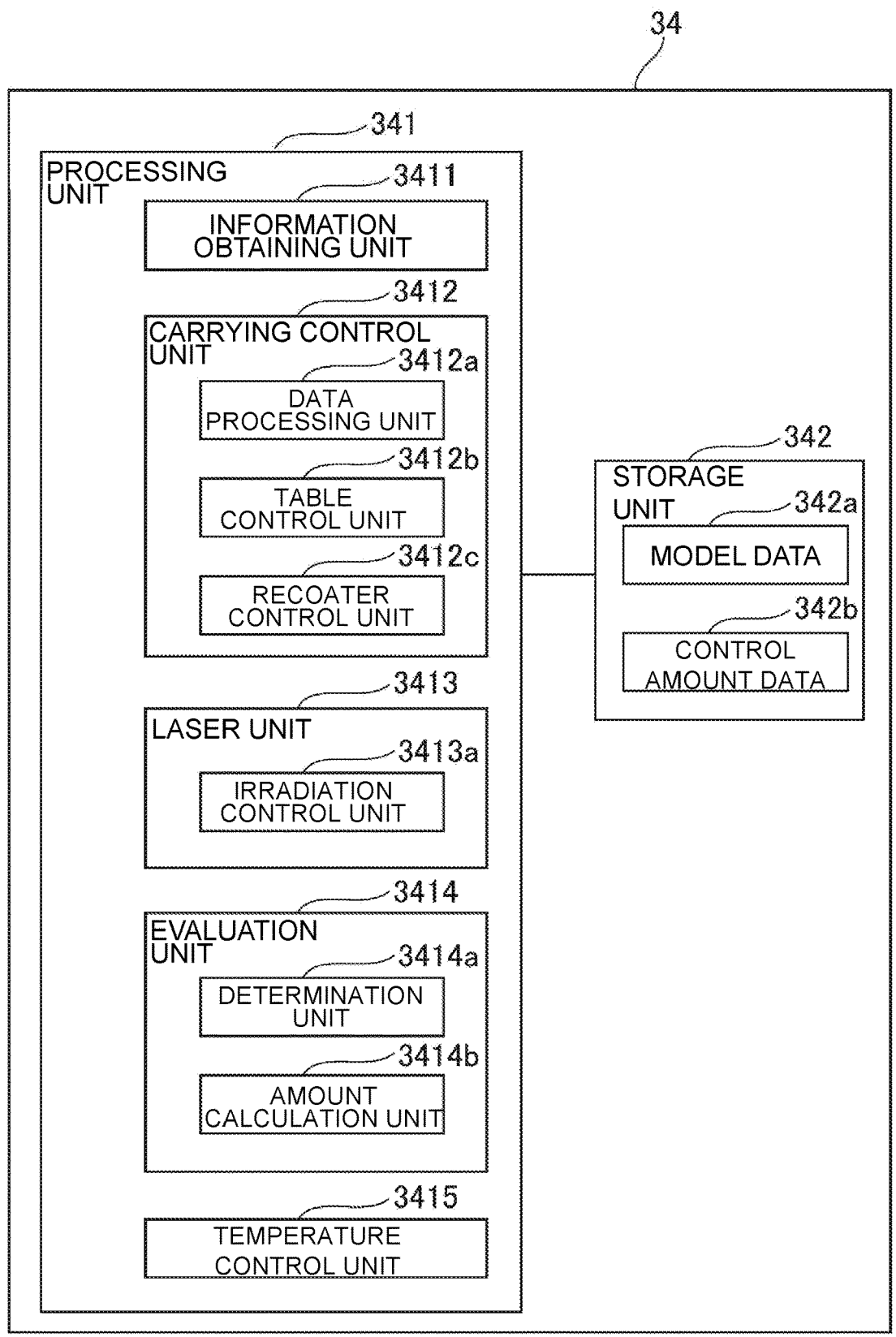
FIG. 6 is a functional block diagram of a control unit in the powder bed fusion apparatus in FIG. 1.

Also, as illustrated in FIG. 1, a control unit (control device) 34 is disposed outside the housing 2. FIG. 6 illustrates a functional block diagram of the control unit 34.

The control unit 34 is a computer including a processing unit (e.g., a central processing unit (CPU)) 341, which is a so-called processor, and a storage unit (e.g., a ROM and a RAM) 342. The storage unit 342 stores a program and data for performing various processes related to model fabrication. By executing that program with the processing unit 341, the control unit 34 controls various devices in the powder bed fusion apparatus 1 based on the program.

The control unit 34 implements various functional modules by executing the program stored in the storage unit 342 with the processing unit 341, which practically functions as the control unit. Specifically, the control unit 34 has an information obtaining unit 3411, a carrying control unit 3412, a laser unit 3413, an evaluation unit 3414, and a temperature control unit 3415 as functional modules. The carrying control unit 3412 includes a data processing unit 3412a, a table control unit 3412b, and a recoater control unit 3412c. The laser unit 3413 includes an irradiation control unit 3413a. The evaluation unit 3414 includes a determination unit 3414a and an amount calculation unit 3414b. These functional units cooperate with each other. Their relation is not limited to the one illustrated in FIG. 6, and various associations and combinations are possible. For example, the data processing unit 3412a may be arranged at the same level as the carrying control unit 3412, and the amount calculation unit 3414b may be arranged at the same level as the evaluation unit 3414. Also, the table control unit 3412b and the recoater control unit 3412c may be provided as separate units and cooperate with each other, and the carrying control unit 3412 may be practically configured by the cooperation between the table control unit 3412b and the recoater control unit 3412c. Note that some of the functional modules may be hardware such as another processor, digital circuit, or analog circuit.

The information obtaining unit 3411 obtains output information from various sensors. For example, the information obtaining unit 3411 obtains position information of the recoater 14. In the present embodiment, the position information of the recoater 14 is input from a position sensor PS provided at a support of the recoater 14. The position sensor PS may be provided at another position. The position information may be estimated based on another control value or the like. The information obtaining unit 3411 also obtains temperature information from the temperature detection units 28a, 28b, and 28c. Moreover, the information obtaining unit 3411 obtains data 342a on a model to be fabricated (model data) input via an input device not illustrated by the operator of the powder bed fusion apparatus 1 or the like, and stores that data in the storage unit 342.

The carrying control unit 3412 controls the movement of the recoater 14 by controlling the actuation of various devices or members, specifically, the raising and lowering of the tables 6, 7, and 11 so as to carry the powder material 8 into the fabrication container 5. The data processing unit 3412a processes the model data 342a to thereby prepare slice data, and stores the slice data of the model data 342a in the storage unit 342 and reads it out. In order to fabricate the model 44 based on the model data 342a and the slice data, the table control unit 3412b outputs control signals to the corresponding drivers mentioned above to thereby control the raising and lowering of the tables 6, 7, and 11, and the recoater control unit 3412c outputs a control signal to the corresponding driver mentioned above to thereby control the movement of the recoater 14.

The laser unit 3413 controls the actuation of the laser beam emission unit 29. Based on the slice data, the irradiation control unit 3413a controls the irradiation of a layer of the powder material 8 carried into the fabrication container 5 by the carrying control unit 3412, i.e., a modeling surface, with a laser beam from the laser beam emission unit 29.

The evaluation unit 3414 evaluates the carrying of the powder material into the fabrication container 5. Based on the temperature information, i.e., temperature, obtained from the temperature detection unit 28b and/or 28c, the determination unit 3414a determines whether the powder material 8 to be carried into the fabrication container 5 has been supplied enough. Based on the result of the determination by the determination unit 3414a, the amount calculation unit 3414b calculates the amount of the powder material 8 to be supplied, i.e., carried, subsequently into the fabrication container 5, which is, in the present embodiment, the amount of the powder material 8 to be supplied, i.e., carried, next into the fabrication container 5. In the present embodiment, the amount of movement of the table 6 or 7 is calculated, which correlates to the amount of the powder material 8 to be carried. Data for this is contained in control amount data 342b in the storage unit 342 and, in the present embodiment, stored in advance.

The temperature control unit 3415 controls the actuation of the heaters of the heating units 15 to 17 based on the temperature information obtained by the information obtaining unit 3411.

The control unit 34 with the above configuration executes control as below.

For example, the control unit 34 outputs control signals to the drivers for the support rods 9, 10, and 12 to raise and lower the supply tables 6 and 7 of the storage containers 3 and 4 and the modeling table 11 of the fabrication container 5. Further, the control unit 34 outputs a control signal to the driver for the recoater 14 to move the recoater 14 leftward or rightward on the upper surface 13a of the carrying plate 13.

Also, based on the kind of the powder material 8 to be used in the model fabrication and the pieces of temperature information of the powder material 8 in the through-holes 13c, 13d, and 13e in the carrying plate 13 output from the temperature detection units 28a, 28b, and 28c and other temperature detection units, the control unit 34 outputs control signals to the heaters 20 to 27 of the upper heating units 15 to 17 to adjust the temperatures of the powder material 8 in the through-holes 13c, 13d, and 13e, in particular, the temperature of the modeling surface in the through-hole 13d.

Further, for the other heating units, the control unit 34 outputs control signals to their heaters based on pieces of temperature data output from the temperature sensors of the heaters to adjust the temperature of the powder material 8 in the fabrication container 5 and the temperature of the powder material 8 on the carrying plate 13.

Furthermore, the control unit 34 outputs a control signal to the laser beam emission unit 29 based on the kind of the powder material 8 mentioned above and the slice data (drawing pattern) of the three-dimensional model to be fabricated to adjust the region of the thin layer at the surface of the powder material 8 in the through-hole 13d that is to be irradiated with a laser beam and the energy density of the laser beam.

Now, slice data of a model will be described.

Slice data is data containing the position of each of a plurality of layers in the planar direction (X direction and Y direction) and the like, the plurality of layers being obtained by slicing and dividing a three-dimensional model to be fabricated at predetermined intervals (e.g., 0.1 mm) in the height direction (Z direction).

Figure 7:
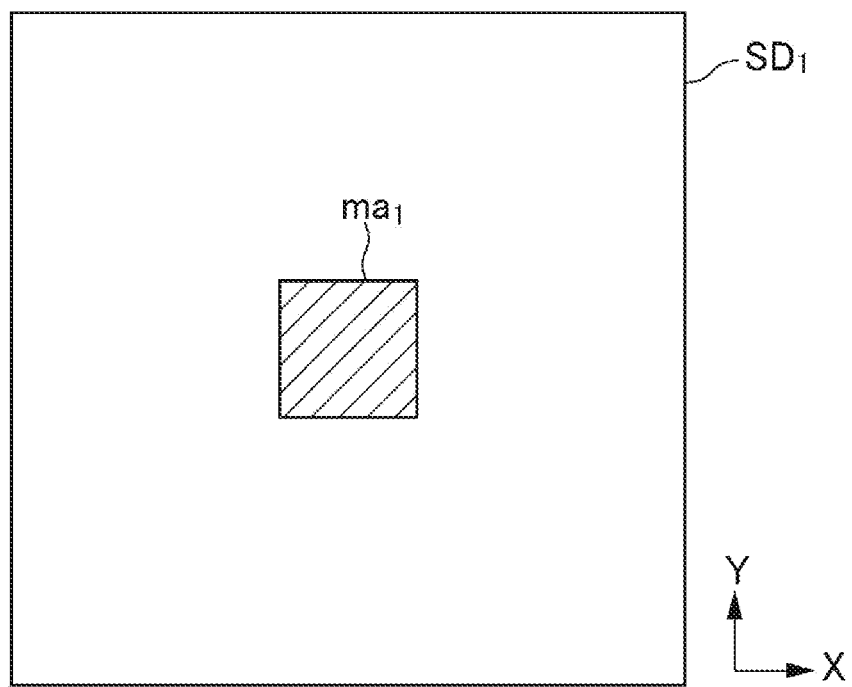
FIG. 7 is a diagram describing an example configuration of a piece of slice data of the first layer of a model to be fabricated from its bottom (lowermost layer) in the case of dividing the model into four layers.
Figure 8:
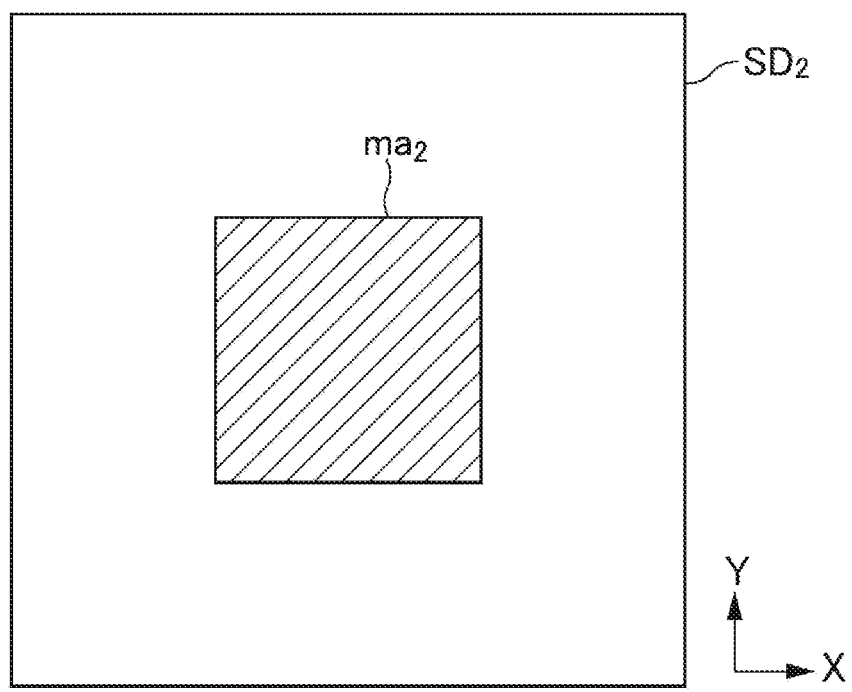
FIG. 8 is a diagram describing an example configuration of a piece of slice data of the second layer of the model to be fabricated from its bottom (intermediate layer) in the case of dividing the model into four layers.
Figure 9:
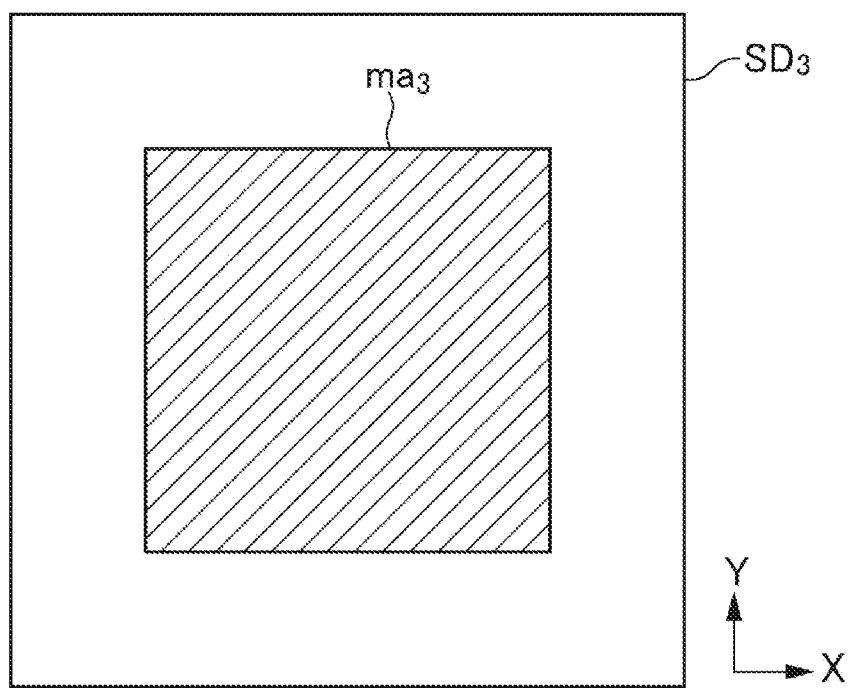
FIG. 9 is a diagram describing an example configuration of a piece of slice data of the third layer of the model to be fabricated from its bottom (intermediate layer) in the case of dividing the model into four layers.
Figure 10:
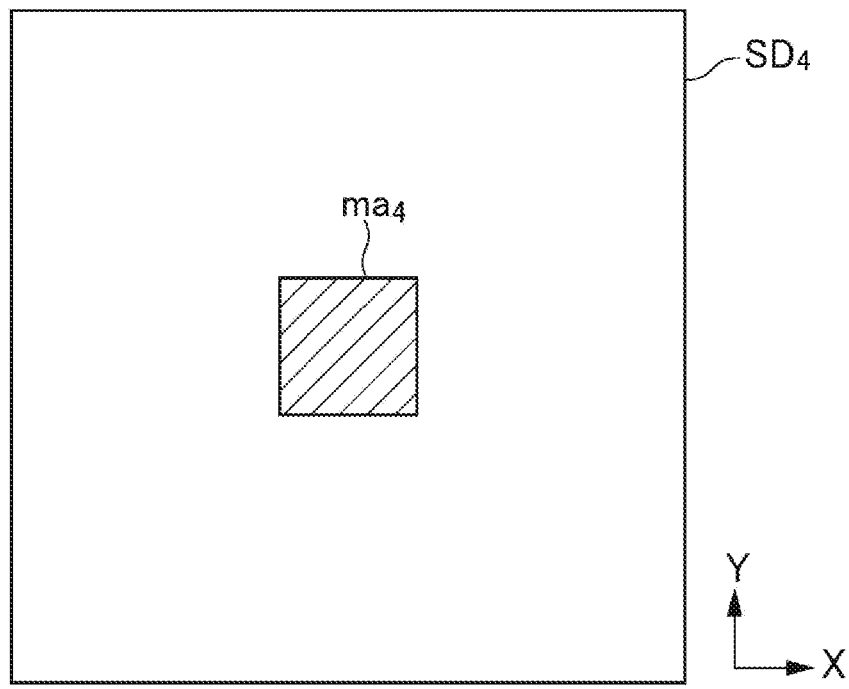
FIG. 10 is a diagram describing an example configuration of a piece of slice data of the fourth layer of the model to be fabricated from its bottom (uppermost layer) in the case of dividing the model into four layers.

FIGS. 7 to 10 are diagrams each describing an example configuration of a piece of slice data of one layer in the case of dividing a model to be fabricated into four layers. Of FIGS. 7 to 10, FIG. 7 is a piece of slice data of the first layer (lowermost layer) of the model from its bottom, FIG. 8 is a piece of slice data of the second layer (intermediate layer), FIG. 9 is a piece of slice data of the third layer (intermediate layer), and FIG. 10 is a piece of slice data of the fourth layer (uppermost layer).

For example, as illustrated in FIG. 7, a piece of first-layer slice data $SD_1$ contains data on a modeling region $ma_1$ to be the first layer of the model. The position of each dot in the piece of slice data $SD_1$, including this modeling region $ma_1$, is represented by coordinates in the X and Y directions. Note that the outer periphery of the piece of slice data $SD_1$ corresponds to the outer periphery of the through-hole 13d in the carrying plate 13 (or the opening of the fabrication container 5).

The pieces of slice data $SD_2$ to $SD_4$ of the remaining second to fourth layers have similar configurations to that of the piece of slice data $SD_1$ of the first layer. Specifically, the pieces of slice data $SD_2$ to $SD_4$ contain pieces of data on modeling regions $ma_2$ to $ma_4$ of the model, respectively.

Figure 11A:
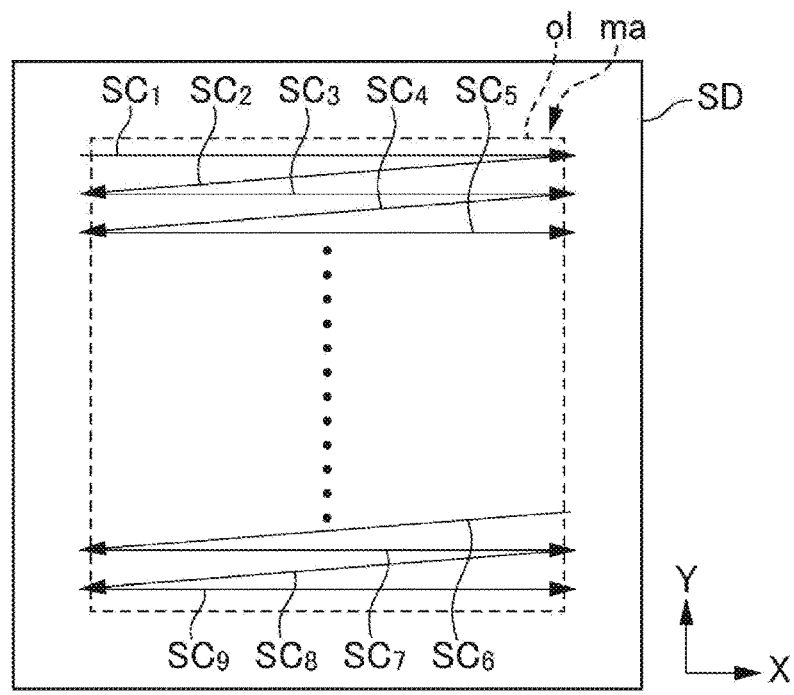
FIG. 11A is a diagram for describing a zigzag scanning method as an example laser beam scanning method.
Figure 11B:
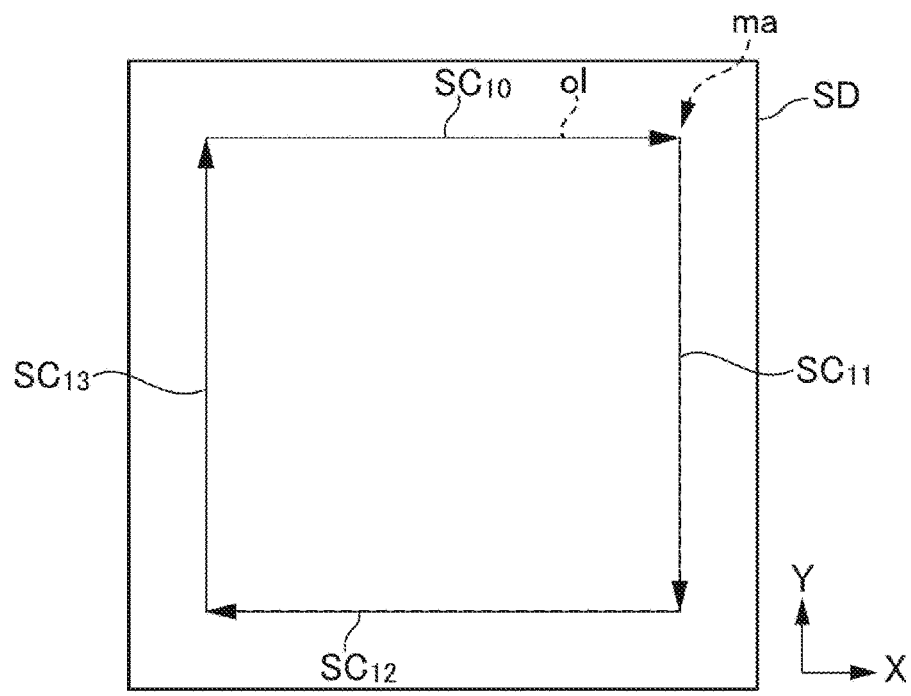
FIG. 11B is a diagram for describing the zigzag scanning method as an example laser beam scanning method.

A laser beam scanning method will be described. FIGS. 11A and 11B are diagrams describing a zigzag scanning method as an example laser beam scanning method.

In the zigzag scanning method, as illustrated in FIG. 11A, scan lines $SC_1$ to $SC_9$ each representing a distance and direction of movement of a laser beam are firstly arranged in a zigzag pattern in a region slightly inward of an outer peripheral line ol of a modeling region ma in slice data SD. Specifically, odd-numbered scan lines $SC_1$, $SC_3$, $SC_5$, $SC_7$, and $SC_9$ extending in the X direction are arranged parallel to one another at given intervals, and even-numbered scan lines $SC_2$, $SC_4$, $SC_6$, and $SC_8$ extending in a direction at an acute angle to the X direction are arranged parallel to one another at given intervals. Then, the scan lines $SC_1$ to $SC_9$ are connected to one another at their ends.

Moreover, as illustrated in FIG. 11B, scan lines $SC_{10}$ to $SC_{13}$ are arranged on the outer peripheral line ol of the modeling region ma in the slice data SD. Then, the scan lines $SC_{10}$ to $SC_{13}$ are connected to one another at their ends.

The control unit 34 controls the laser beam emission unit 29 based on the pieces of slice data $SD_1$ to $SD_4$ and the zigzag scanning method described above to emit and scan a laser beam over regions (modeling regions) of thin layers of the powder material 8 in the through-hole 13d in the carrying plate 13 corresponding to the modeling regions $ma_1$ to $ma_4$ in the pieces of slice data $SD_1$ to $SD_4$. As a result, a laser beam is applied to a modeling region of each thin layer of the powder material 8.

The laser beam scanning method is not limited to the zigzag scanning method.

Examples of usable laser beam scanning methods include a raster scanning method in which scan lines SC extending in the same direction (e.g., the X or Y direction) are arranged parallel to each other at given intervals on the modeling region ma in the slice data SD, and a scanning method in which a scan line SC is arranged along the outer peripheral line ol in a spiral pattern at given intervals.

The energy density of a laser beam will be described. The energy density is represented by Equation (1) below.

$$E = P/(V \cdot SS \cdot e) \quad (1)$$

In Equation (1), E is the energy density ($J/m^3$) of the laser beam, P is the output (W) of the laser beam, V is the scanning speed (m/s) of the laser beam, SS is the scanning intervals (m) of the laser beam, and e is the thickness (m) of the thin layer of the powder material 8.

As understood from Equation (1), given that, for example, the thickness e of the thin layer of the powder material 8 is the same, raising the output P, slowing down the scanning speed V, or narrowing the scanning intervals SS can increase the energy density E of the laser beam to be received by the modeling region of the thin layer of the powder material 8 when the laser beam is applied to the modeling region.

The parameters of the energy density E other than the thickness e of the thin layer of the powder material 8, namely, the output P, scanning speed V, and scanning intervals SS of the laser beam, are parameters that can be changed by controlling the laser beam emission unit 29.

The control unit 34 adjusts the energy density E of the laser beam to be received by the modeling region of the thin layer of the powder material 8 by controlling the laser beam emission unit 29 to change one of the output P, scanning speed V, or scanning intervals SS of the laser beam.

The powder bed fusion apparatus 1 is configured as described above.

Next, a model fabrication method using the powder bed fusion apparatus 1 will be described.

For a simple description, the following assumes that the fabrication container 5 and the storage containers 3 and 4 supplied with the powder material 8 have been accommodated in the housing 2 of the powder bed fusion apparatus 1 and the powder bed fusion apparatus 1 is in the state illustrated in FIG. 4.

Specifically, the upper surface of the powder material 8 in each of the storage containers 3 and 4 is at the same height as the upper surface 13a of the carrying plate 13. Moreover, the upper surface of the modeling table 11 of the fabrication container 5 is at the same height as the upper surface 13a of the carrying plate 13. Furthermore, the recoater 14 is disposed to the left of the storage container 3 on the upper surface 13a of the carrying plate 13.

When the powder bed fusion apparatus 1 is in this state, the control unit 34 firstly creates slice data SD of the model 44 based on three-dimensional data of the model input from outside the apparatus 1 and the kind of the powder material 8, and stores the slice data SD in the storage unit 342. Specifically, the data processing unit 3412a performs the above.

Next, the control unit 34 controls the driver for the support rod 9 of the storage container 3, the driver for the support rod 10 of the storage container 4, the driver for the support rod 12 of the fabrication container 5, and the driver for the recoater 14 so as to form a buffer layer, i.e., a thin layer, of the powder material 8 on the modeling table 11 of the fabrication container 5. Here, the thin layer is a relatively thin layer and, as is clear from the description of the present specification, is intended to be a layer of the powder material having a predetermined thickness. The table control unit 3412b and the recoater control unit 3412c perform the above process.

In the powder bed fusion apparatus 1, a thin layer of the powder material 8 is formed on the modeling table 11 before the start of the model fabrication so that the model fabricated in the fabrication container 5 will not be fixedly attached to the upper surface of the modeling table 11.

A method of forming the thin layer will be described. FIGS. 12 to 18 are cross-sectional views of a thin layer being formed.

Figure 12:
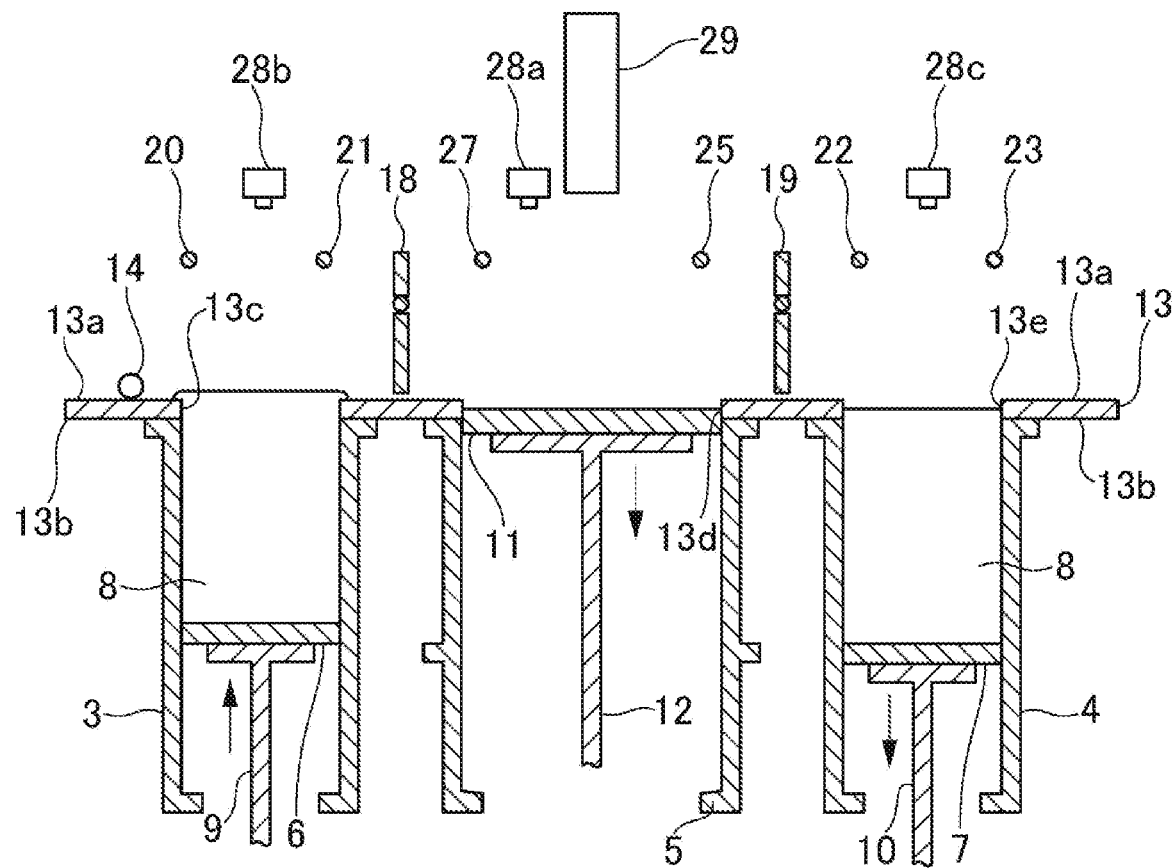
FIG. 12 is a cross-sectional view corresponding to FIG. 4, illustrating a thin layer of a powder material being formed.

Firstly, as illustrated in FIG. 12, the control unit 34 raises the supply table 6 of the left storage container 3 by controlling the driver for the support rod 9. This causes the powder material 8 in the storage container 3 to project upward from the upper surface 13a of the carrying plate 13 through the through-hole 13c.

Further, the control unit 34 lowers the modeling table 11 of the fabrication container 5 by the thickness of a single thin layer of the powder material 8, e.g., 0.1 mm, by controlling the driver for the support rod 12 and also lowers the supply table 7 of the right storage container 4 by controlling the driver for the support rod 10.

Figure 13:
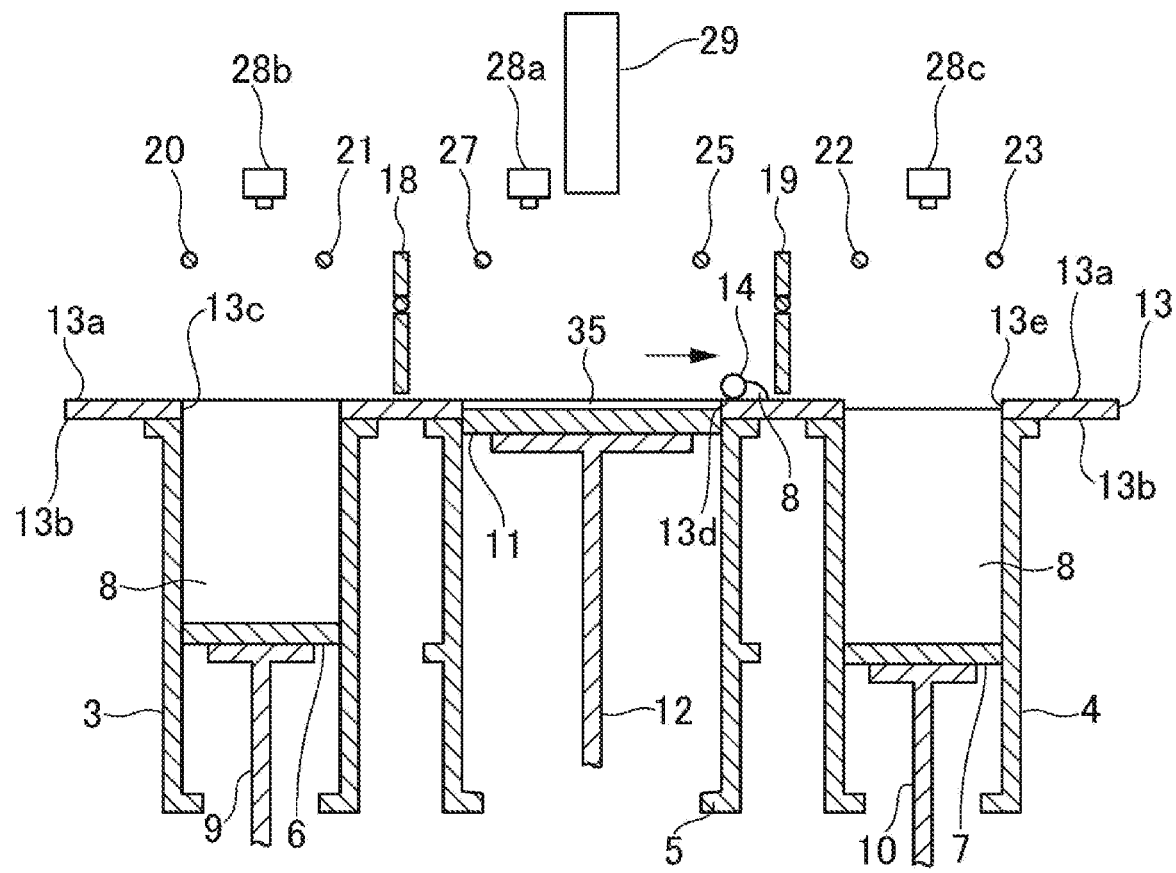
FIG. 13 is a cross-sectional view corresponding to FIG. 4, illustrating a thin layer of the powder material being formed.

Subsequently, as illustrated in FIG. 13, the control unit 34 moves the recoater 14 rightward on the upper surface 13a of the carrying plate 13 by controlling the driver for the recoater 14. This causes the recoater 14 to scrape the powder material 8 in the storage container 3 projecting from the upper surface 13a and carry it into the fabrication container 5 via the upper surface 13a and the through-hole 13d.

In this way, the powder material 8 in the storage container 3 is supplied to the fabrication container 5, and a first thin layer 35 of the powder material 8 is formed on the modeling table 11.

Figure 14:
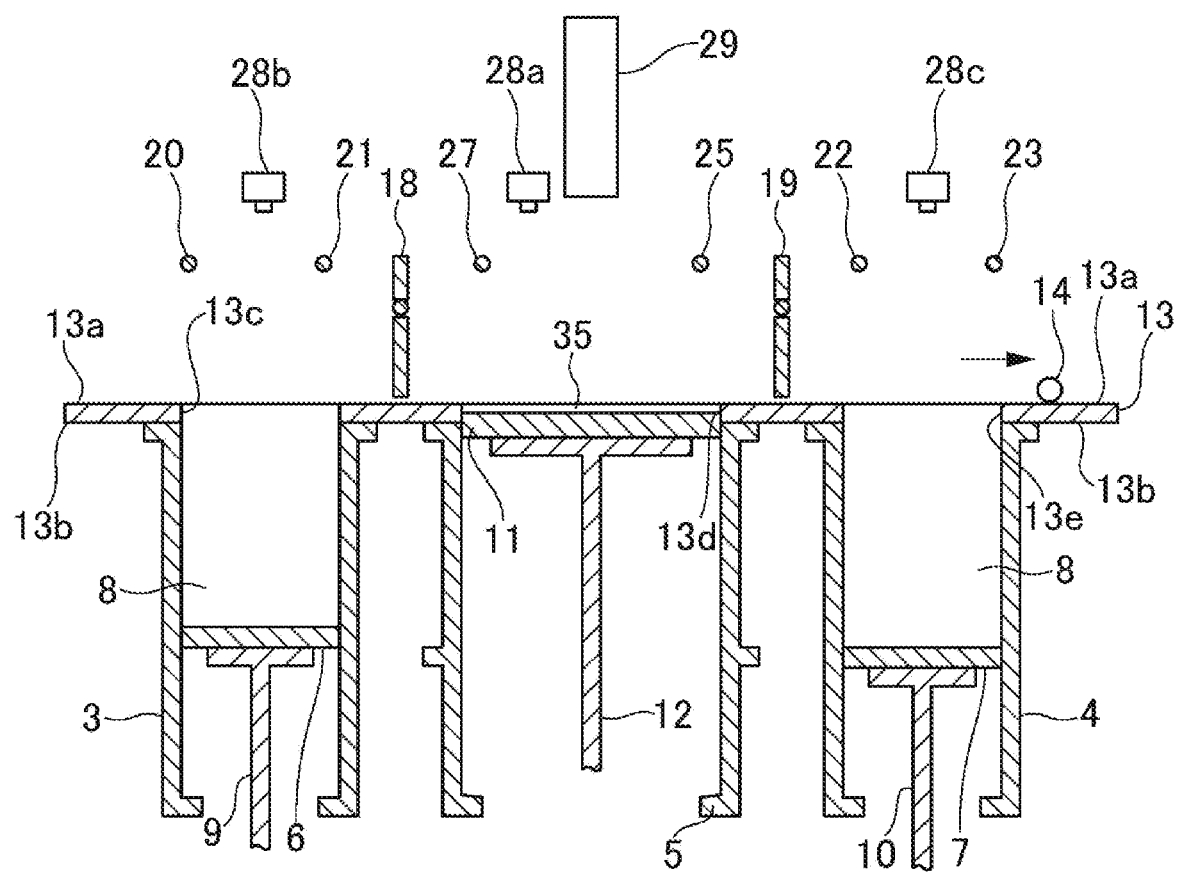
FIG. 14 is a cross-sectional view corresponding to FIG. 4, illustrating a thin layer of the powder material being formed.

As illustrated in FIG. 14, the control unit 34 further moves the recoater 14 rightward. This causes the recoater 14 to carry the powder material 8 left unused for the formation of the thin layer 35 into the storage container 4 via the upper surface 13a and the through-hole 13e.

In this way, the remaining powder material 8 is stored in the storage container 4.

The control unit 34 then stops the recoater 14 at a position to the right of the storage container 4. At this time, though not illustrated in FIG. 14, etc., if there is an excess powder material 8 that could not be stored in the storage container 4, that excess powder material 8 enters the reservoir container 4E and is held therein.

Figure 15:
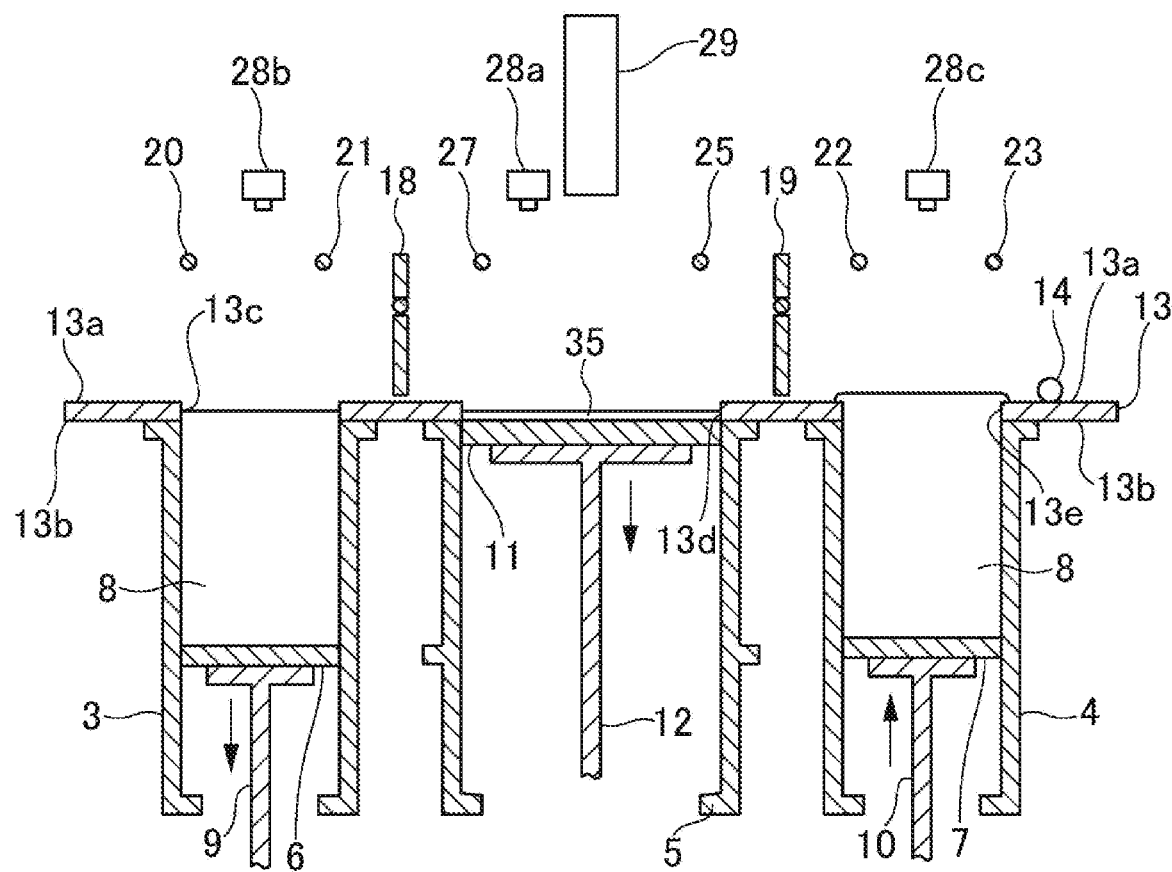
FIG. 15 is a cross-sectional view corresponding to FIG. 4, illustrating a thin layer of the powder material being formed.

Next, as illustrated in FIG. 15, the control unit 34 raises the supply table 7 of the storage container 4. This causes the powder material 8 in the storage container 4 to project upward from the upper surface 13a of the carrying plate 13 through the through-hole 13e.

Further, the control unit 34 lowers the modeling table 11 of the fabrication container 5 by the thickness of a single thin layer of the powder material 8 mentioned above, and also lowers the supply table 6 of the storage container 3.

Figure 16:
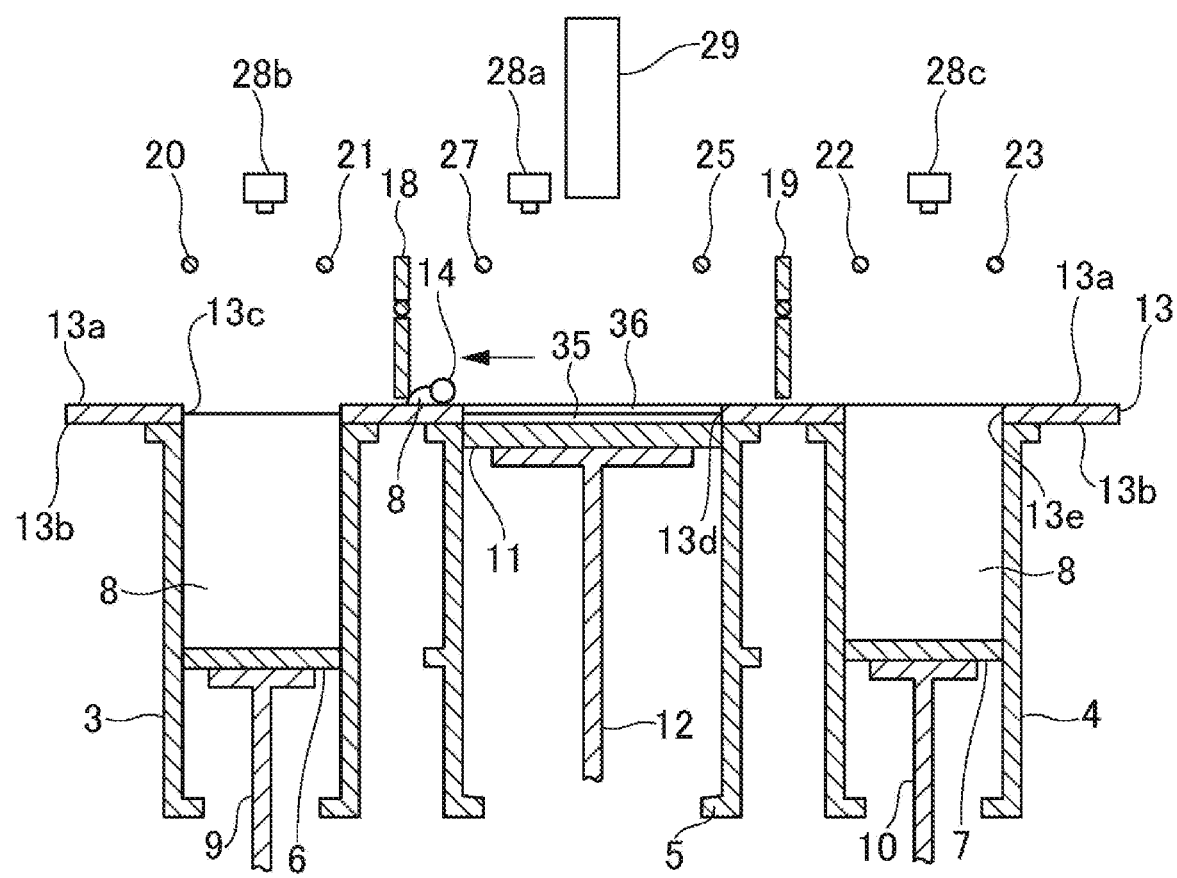
FIG. 16 is a cross-sectional view corresponding to FIG. 4, illustrating a thin layer of the powder material being formed.

Subsequently, as illustrated in FIG. 16, the control unit 34 moves the recoater 14 leftward on the upper surface 13a of the carrying plate 13. This causes the recoater 14 to scrape the powder material 8 in the storage container 4 projecting from the upper surface 13a and carry it into the fabrication container 5 via the upper surface 13a and the through-hole 13d.

In this way, the powder material 8 in the storage container 4 is supplied to the fabrication container 5, and a second thin layer 36 of the powder material 8 is formed on the modeling table 11.

Figure 17:
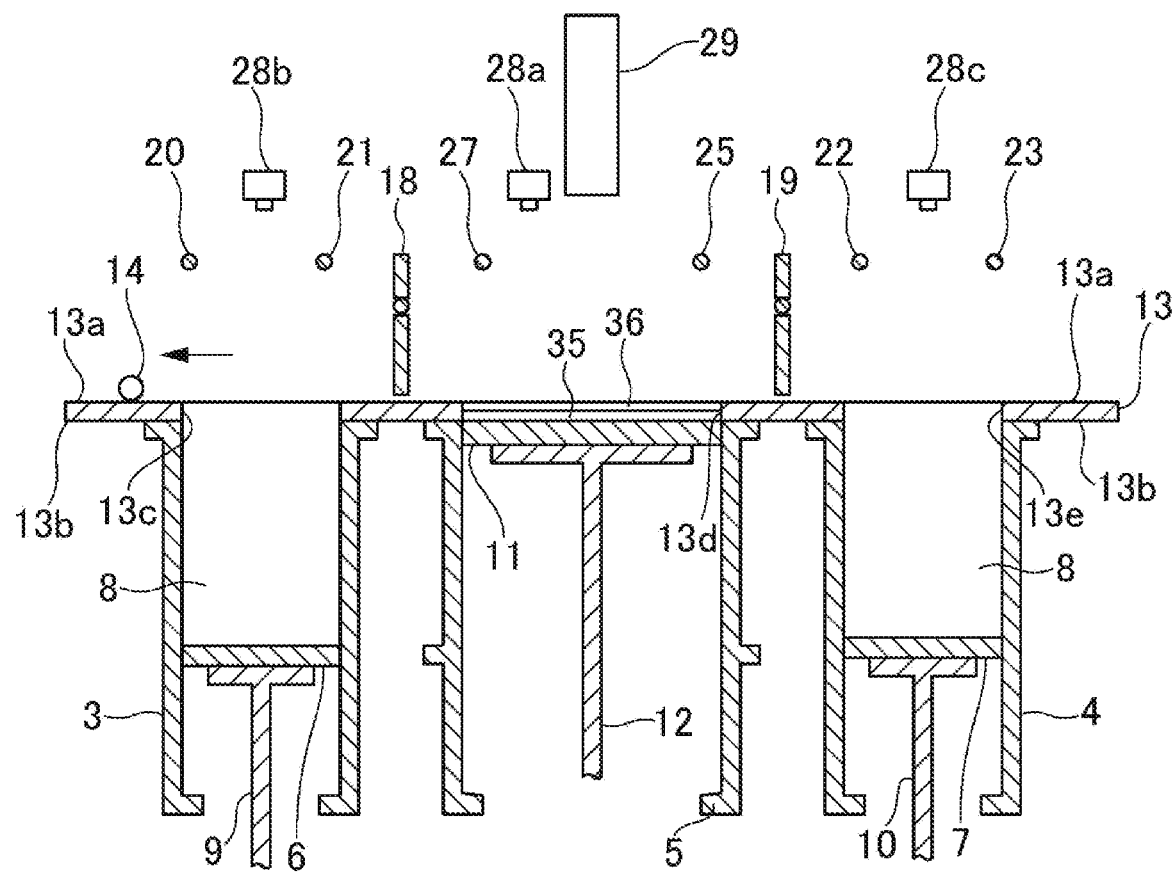
FIG. 17 is a cross-sectional view corresponding to FIG. 4, illustrating a thin layer of the powder material being formed.

As illustrated in FIG. 17, the control unit 34 further moves the recoater 14 leftward. This causes the recoater 14 to carry the powder material 8 left unused for the formation of the thin layer 36 into the storage container 3 via the upper surface 13a and the through-hole 13c.

In this way, the remaining powder material 8 is stored in the storage container 3.

The control unit 34 then stops the recoater 14 at a position to the left of the storage container 3. At this time, though not illustrated in FIG. 17, etc., if there is an excess powder material 8 that could not be stored in the storage container 3, that excess powder material 8 enters the reservoir container 3E and is held therein.

Thereafter, in the fabrication container 5, a third thin layer 37 of the powder material 8 is formed on the second thin layer 36 in the same manner as the formation of the first thin layer 35, and a fourth thin layer 38 of the powder material 8 is further formed on the third thin layer 37 in the same manner as the formation of the second thin layer 36.

Figure 18:
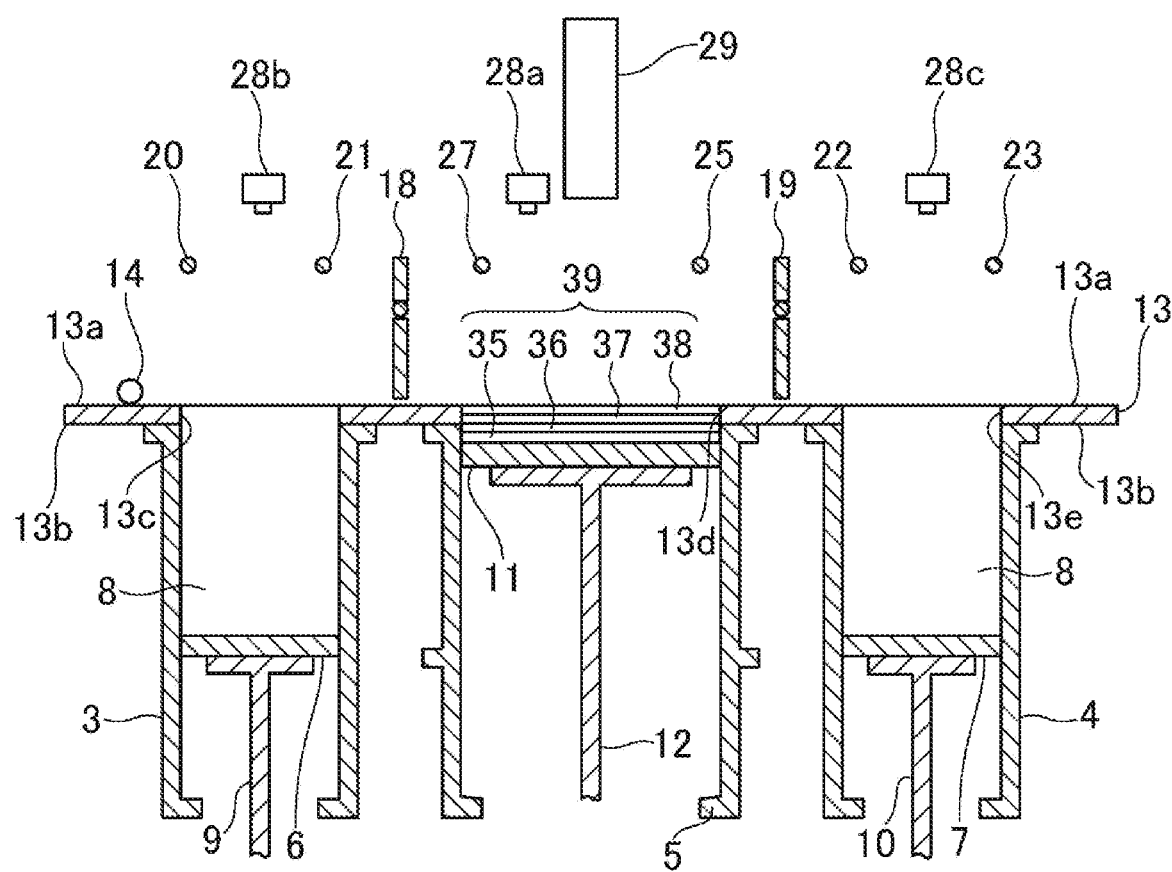
FIG. 18 is a cross-sectional view corresponding to FIG. 4, illustrating a thin layer of the powder material being formed.

By repeating such formation of a thin layer of the powder material 8 a predetermined number of times, the thin layers 35 to 38 of the powder material 8 are laminated on the modeling table 11 of the fabrication container 5, so that a buffer layer 39 with a predetermined thickness (e.g., a thickness of 10 mm) is formed, as illustrated in FIG. 18.

Note that FIG. 18 illustrates the four thin layers 35 to 38 of the powder material 8 as the buffer layer 39 for convenience. The actual number of thin layers of the powder material 8 is a number corresponding to the thickness of the layer 39.

Next, the control unit 34 preheats the powder material 8 in the storage containers 3 and 4 and the powder material 8 in the fabrication container 5 by controlling the heaters 20 to 27 of the upper heating units 15 to 17.

As will be described later, the powder bed fusion apparatus 1 applies a laser beam to the modeling region of each thin layer of the powder material 8 to fuse the powder material 8 and then lets the powder material 8 solidify to form a solidified layer. At this time, the thin layer of the powder material 8, i.e., the modeling surface, may have a large difference in temperature between the modeling region, to which the laser beam is applied, and the region around it. This may lead to excessive shrinkage of the solidified layer after the application of the laser beam, which causes warpage of the solidified layer.

In order to suppress such warpage of the solidified layer, the powder material 8 in the storage containers 3 and 4 and the powder material 8 in the fabrication container 5 are preheated before the start of the model fabrication. A method of this preheating will be described.

Firstly, when the thin layer 39 starts being formed, the control unit 34 simultaneously turns on the heaters 20 to 27 of the upper heating units 15 to 17 and the heaters of the other heating units (side heating unit, lower heating unit, and carrying plate heating unit).

Next, the control unit 34 adjusts the amounts of heat generation by the heaters 20 to 27 based on the kind of the powder material 8 and the temperature information, e.g., data on the surface temperature, of the powder material 8 in the through-holes 13c, 13d, and 13e in the carrying plate 13 output from the temperature detection units 28a, 28b, and 28c and the other temperature detection units. The control unit 34 further adjusts the amounts of heat generation by the heaters of the other heating units based on the pieces of temperature data output from the temperature sensors of the heaters.

As a result, the surface of the powder material 8 in each of the through-holes 13c, 13d, and 13e in the carrying plate 13 is heated to a predetermined temperature and maintained at this temperature.

In particular, the surface of the powder material 8 in the through-hole 13d communicating with the opening of the fabrication container 5, i.e., the modeling surface, is maintained at a temperature suitable for starting the model fabrication, which, in the present embodiment, is a temperature lower than the melting point of the powder material 8 by about 10° C. to 15° C.

For example, when polypropylene powder is used as the powder material 8, the surface of the powder material 8 in the through-hole 13d is maintained at a suitable temperature of approximately 115° C. to 120° C. since the melting point of polypropylene is approximately 130° C.

On the other hand, the surface of the powder material 8 in each of the through-holes 13c and 13e communicating with the openings of the storage containers 3 and 4 is maintained at a predetermined temperature lower than the surface temperature of the powder material 8 in the through-hole 13d communicating with the opening of the fabrication container 5. Thus, the surface portion of the powder material 8 stored in one of the storage containers 3 and 4, namely, the storage container 3, is heated to and maintained at a first predetermined temperature; the surface portion of the powder material 8 stored in the other of the storage containers 3 and 4, namely, the storage container 4, is heated to and maintained at a second predetermined temperature; and the surface portion of the powder material 8 stored in the fabrication container 5 is heated to and maintained at a third predetermined temperature higher than the first predetermined temperature and also higher than the second predetermined temperature. In the present embodiment, the first predetermined temperature is equal to the second predetermined temperature but may be different from the second predetermined temperature.

As mentioned above, the powder material 8 is a thermoplastic resin powder. Thus, the surface of the powder material 8 in the fabrication container 5, i.e., the modeling surface, is heated to the third predetermined temperature lower than the melting point of the powder material 8 by 10° C. to 15° C. The powder material 8 in each of the storage containers 3 and 4, which is to be supplied to the fabrication container 5, is heated to the first or second predetermined temperature lower than this third predetermined temperature by 20° C. to 30° C. By stably maintaining the temperature of the powder material in each of these containers 3, 4, and 5 at the corresponding predetermined temperature, the powder material in the fabrication container 5 melted as a result of irradiation of the modeling surface with a laser beam is gradually cooled as it re-solidifies, in an attempt to obtain a model 44 without distortion.

The powder material 8 is preheated in this manner. Moreover, such preheating is continuously performed not only during the formation of the thin layer 39 but also during the fabrication of a model on the thin layer 39 to be described later.

To perform the preheating, all heaters of the powder bed fusion apparatus 1 are turned on simultaneously with the start of formation of the thin layer 39. However, all heaters of the powder bed fusion apparatus 1 may be turned on before the start of formation of the thin layer 39. For example, all heaters of the powder bed fusion apparatus 1 may be turned on after the storage containers 3 and 4 and the fabrication container 5 are accommodated in the housing 2 of the powder bed fusion apparatus 1.

In one example, there may be some difference between the temperature which the powder material in the storage container 3 is to be heated to and maintained at (target temperature) and the temperature which the powder material in the storage container 4 is to be heated to and maintained at (target temperature). For example, there may be a difference of approximately 10° C. and more specifically a difference of 1° C. to 3° C. This difference between the temperature which the powder material in the storage container 3 is to be heated to and maintained at and the temperature which the powder material in the storage container 4 is to be heated to and maintained at is preferably set by taking into account the individual difference between the temperature detection units 28b and 28c and/or the individual difference between the upper heating units 15 and 16, i.e., the individual difference between the heaters of the upper heating unit 15 and the heaters of the upper heating unit 16. In the case of setting a temperature difference as above, a temperature Tsp to be mentioned later is preferably an individually set temperature (target temperature).

Next, a model fabrication method will be described. FIGS. 19 to 27 are cross-sectional views of a model being fabricated.

Figure 19:
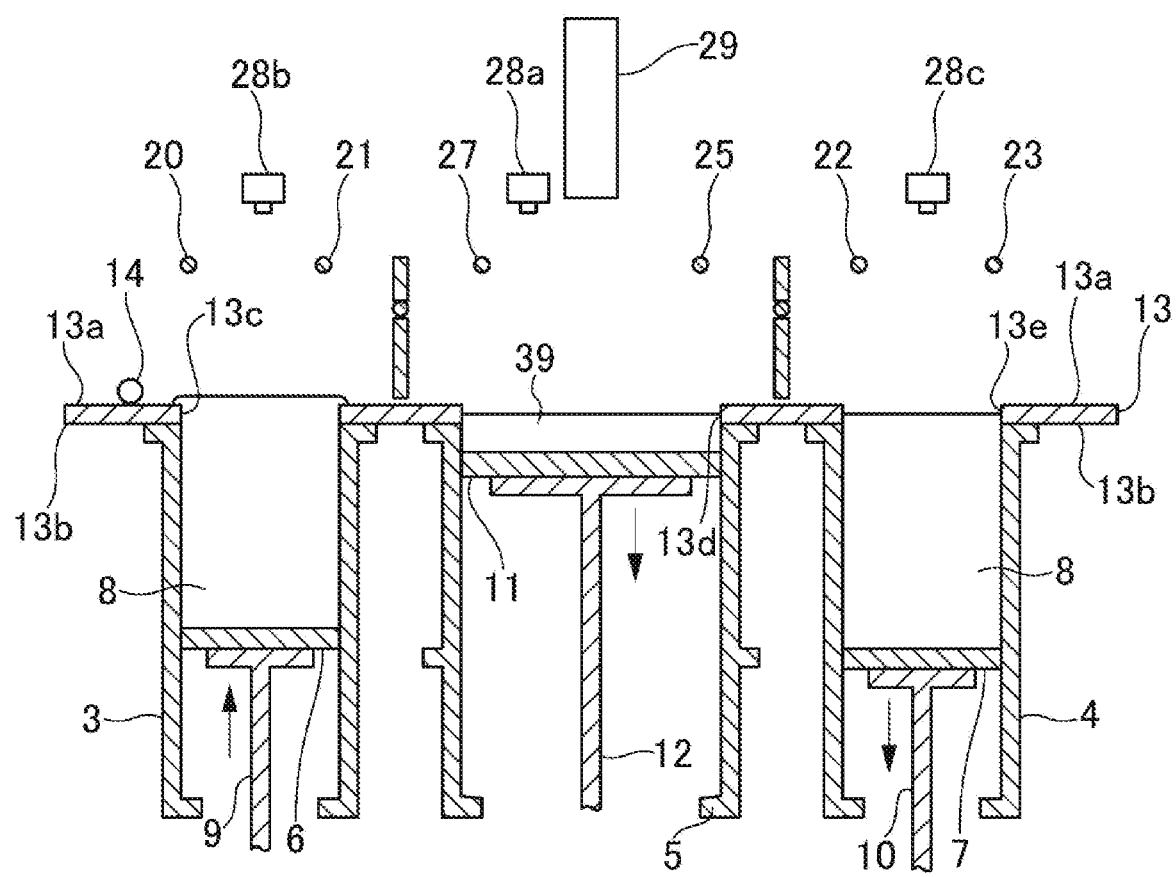
FIG. 19 is a cross-sectional view corresponding to FIG. 4, illustrating a model being fabricated.

After forming the thin layer 39 and preheating the powder material 8, the control unit 34 raises the supply table 6 of the left storage container 3, as illustrated in FIG. 19. This causes the powder material 8 in the storage container 3 to project upward from the upper surface 13a of the carrying plate 13 through the through-hole 13c.

Further, the control unit 34 lowers the modeling table 11 by the thickness (0.1 mm) of a single thin layer of the powder material 8 mentioned above, and also lowers the supply table 7 of the left storage container 4.

Figure 20:
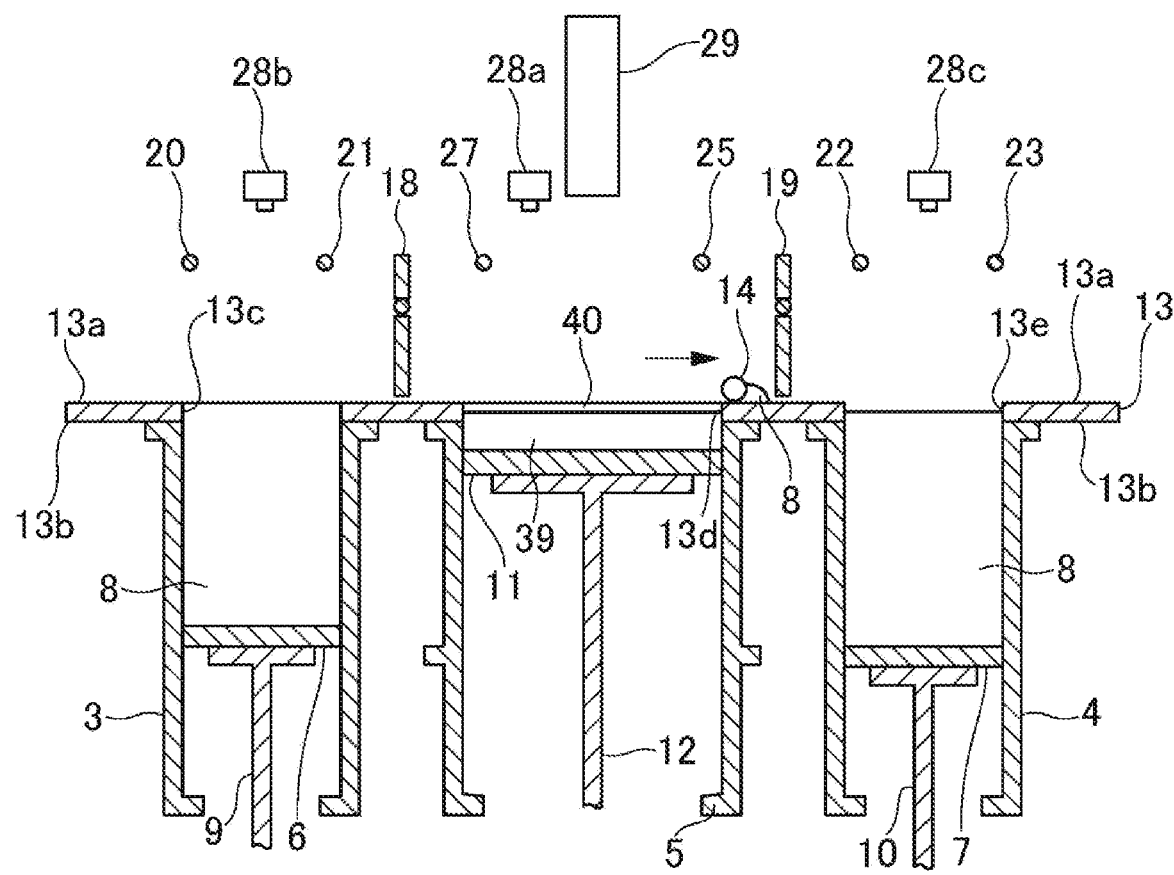
FIG. 20 is a cross-sectional view corresponding to FIG. 4, illustrating the model being fabricated.

Subsequently, as illustrated in FIG. 20, the control unit 34 moves the recoater 14 rightward on the upper surface 13a of the carrying plate 13. This causes the recoater 14 to scrape the powder material 8 in the storage container 3 projecting from the upper surface 13a and carry it into the fabrication container 5 via the upper surface 13a and the through-hole 13d.

As a result, a thin layer 40 of the powder material 8, which is the first layer for the model fabrication, is formed on the thin layer 39.

Figure 21:
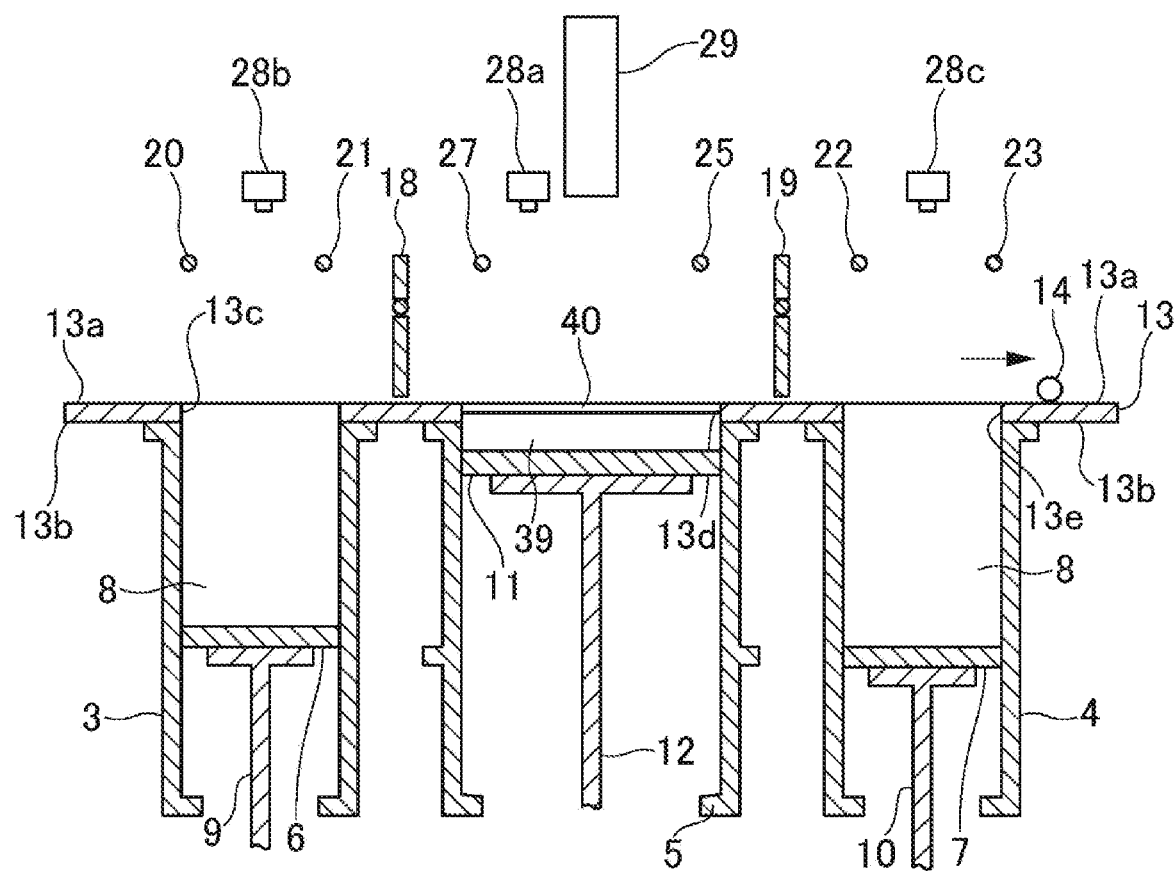
FIG. 21 is a cross-sectional view corresponding to FIG. 4, illustrating the model being fabricated.

As illustrated in FIG. 21, the control unit 34 further moves the recoater 14 rightward. This causes the recoater 14 to carry the powder material 8 left unused for the formation of the thin layer 40 into the storage container 4 via the upper surface 13a and the through-hole 13e.

In this way, the remaining powder material 8 is stored in the storage container 4.

The control unit 34 then stops the recoater 14 at a position to the right of the storage container 4. As a result, as mentioned earlier, if there is an excess powder material 8 that could not be put in the storage container 4, that excess powder material 8 is put in the reservoir container 4E.

Figure 22:
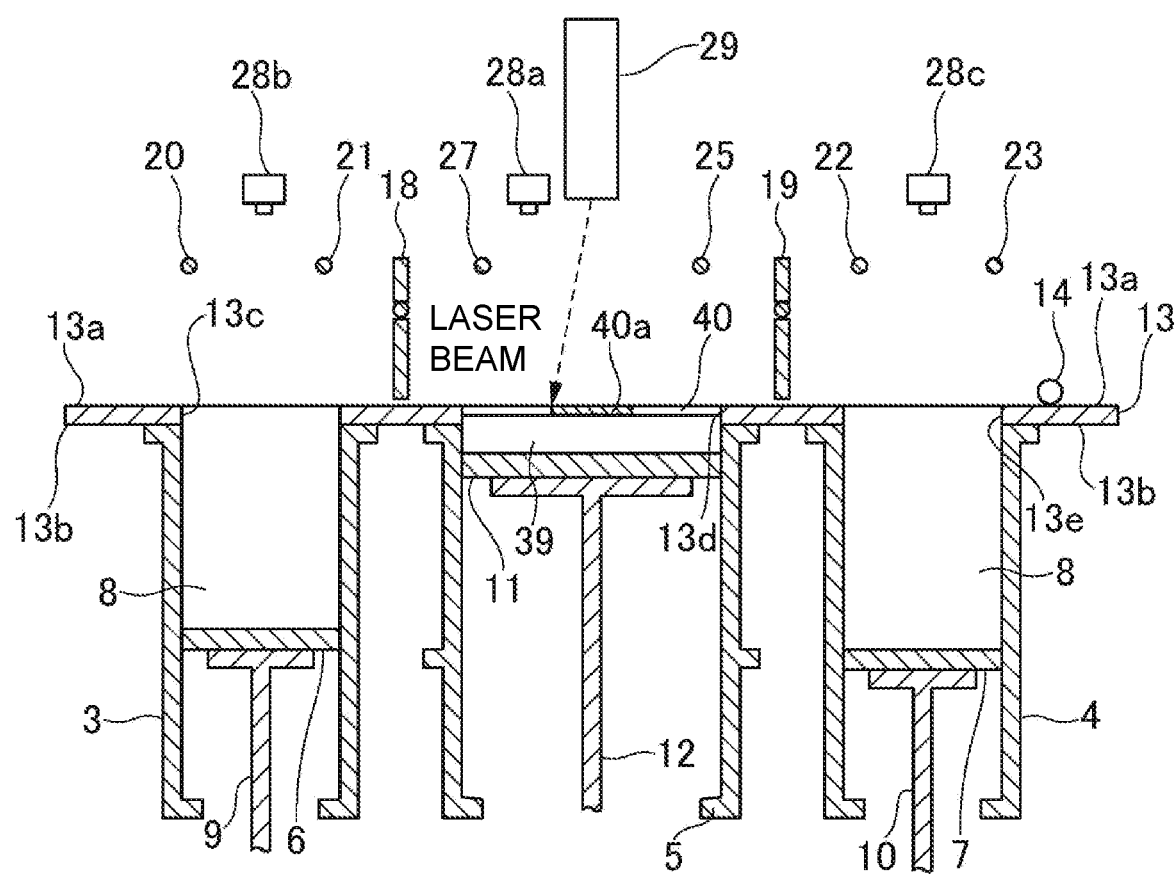
FIG. 22 is a cross-sectional view corresponding to FIG. 4, illustrating the model being fabricated.

Next, as illustrated in FIG. 22, the control unit 34 controls the laser beam emission unit 29 based on the piece of first-layer slice data $SD_1$ to emit and scan a laser beam over the region (modeling region) of the first thin layer 40 corresponding to the modeling region $ma_1$ in the piece of the slice data $SD_1$.

This is how the modeling region of the first thin layer 40 is irradiated with a laser beam. As a result, the powder material 8 in this modeling region is fused and then solidifies to form a first solidified layer 40a.

The control unit 34 then stops the emission and scan of the laser beam.

Figure 23:
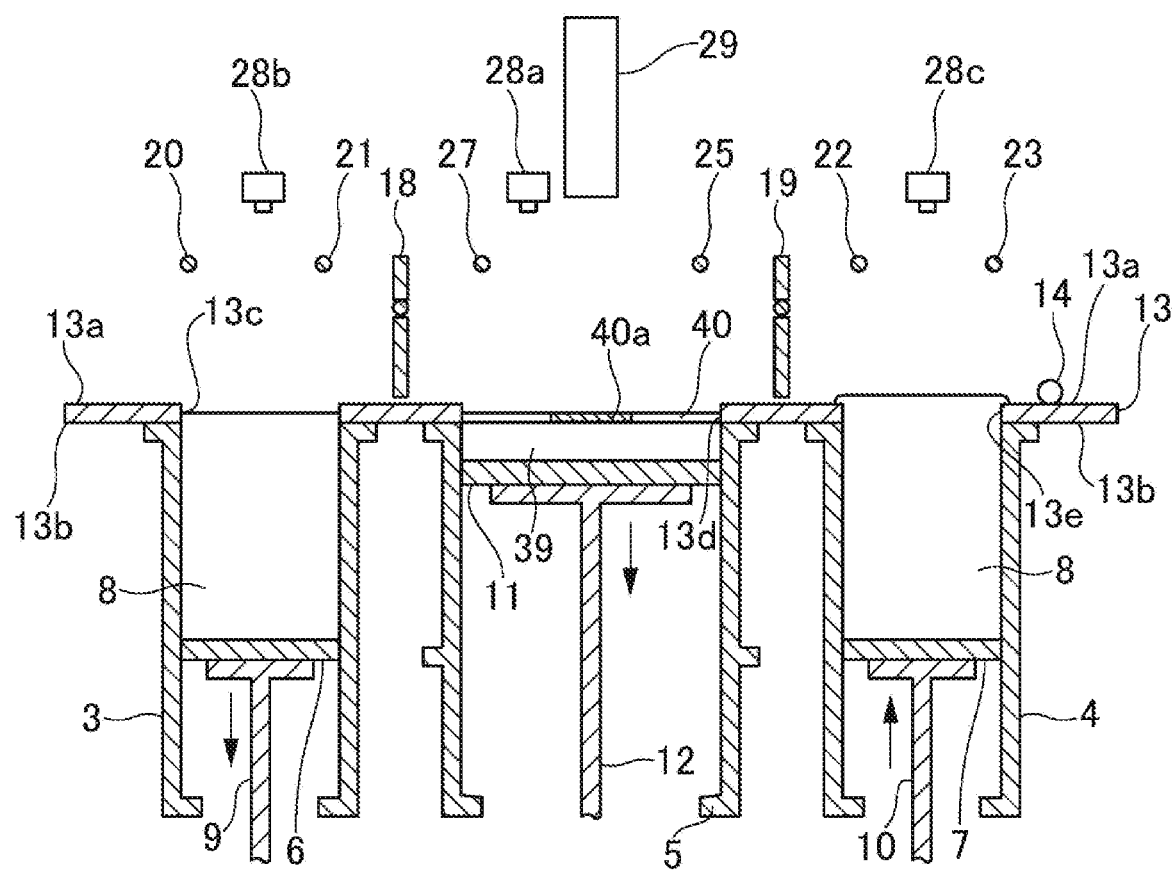
FIG. 23 is a cross-sectional view corresponding to FIG. 4, illustrating the model being fabricated.

Next, as illustrated in FIG. 23, the control unit 34 raises the supply table 7 of the storage container 4. This causes the powder material 8 in the right storage container 4 to project upward from the upper surface 13a of the carrying plate 13 through the through-hole 13e.

Further, the control unit 34 lowers the modeling table 11 by the thickness of a single thin layer of the powder material 8 and also lowers the supply table 6 of the left storage container 3.

Figure 24:
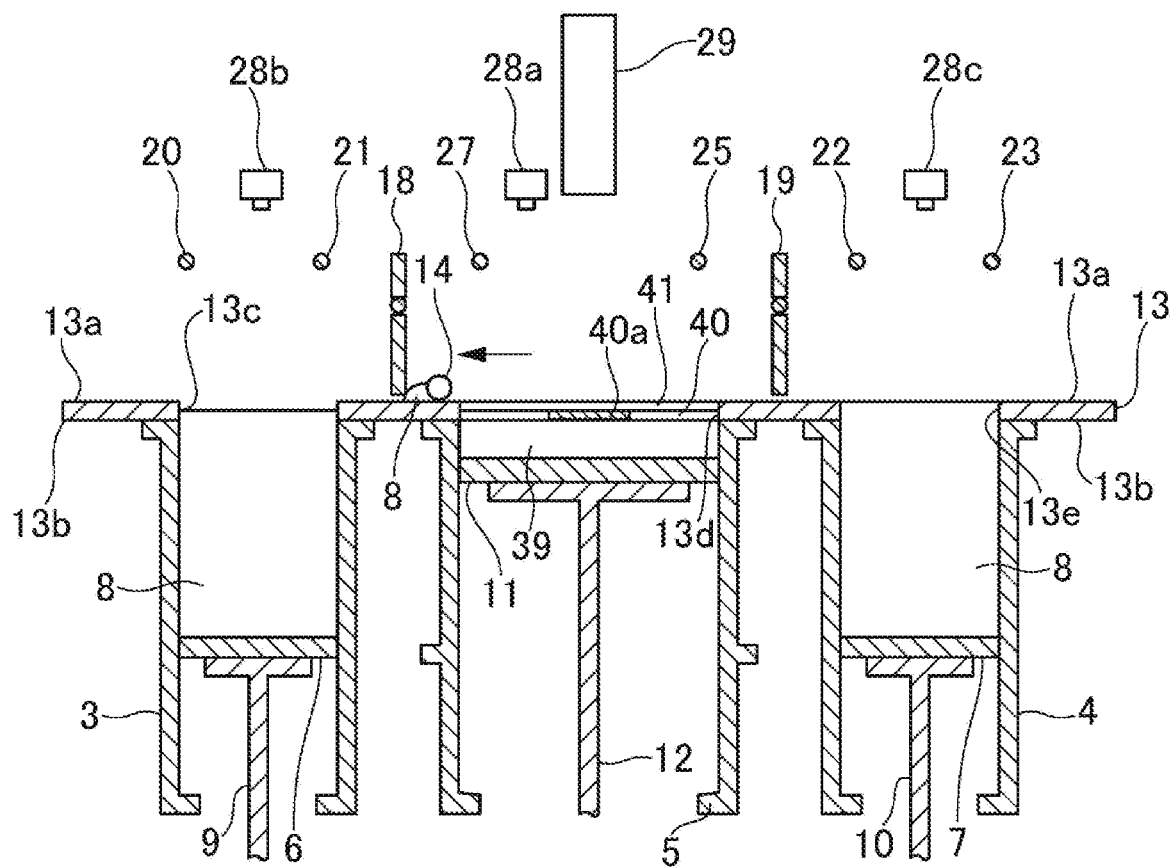
FIG. 24 is a cross-sectional view corresponding to FIG. 4, illustrating the model being fabricated.

Subsequently, as illustrated in FIG. 24, the control unit 34 moves the recoater 14 leftward on the upper surface 13a of the carrying plate 13. This causes the recoater 14 to scrape the powder material 8 in the storage container 4 projecting from the upper surface 13a and carry it into the fabrication container 5 via the upper surface 13a and the through-hole 13d.

As a result, a second thin layer 41 of the powder material 8 is formed on the first thin layer 40, in which the solidified layer 40a is formed.

Figure 25:
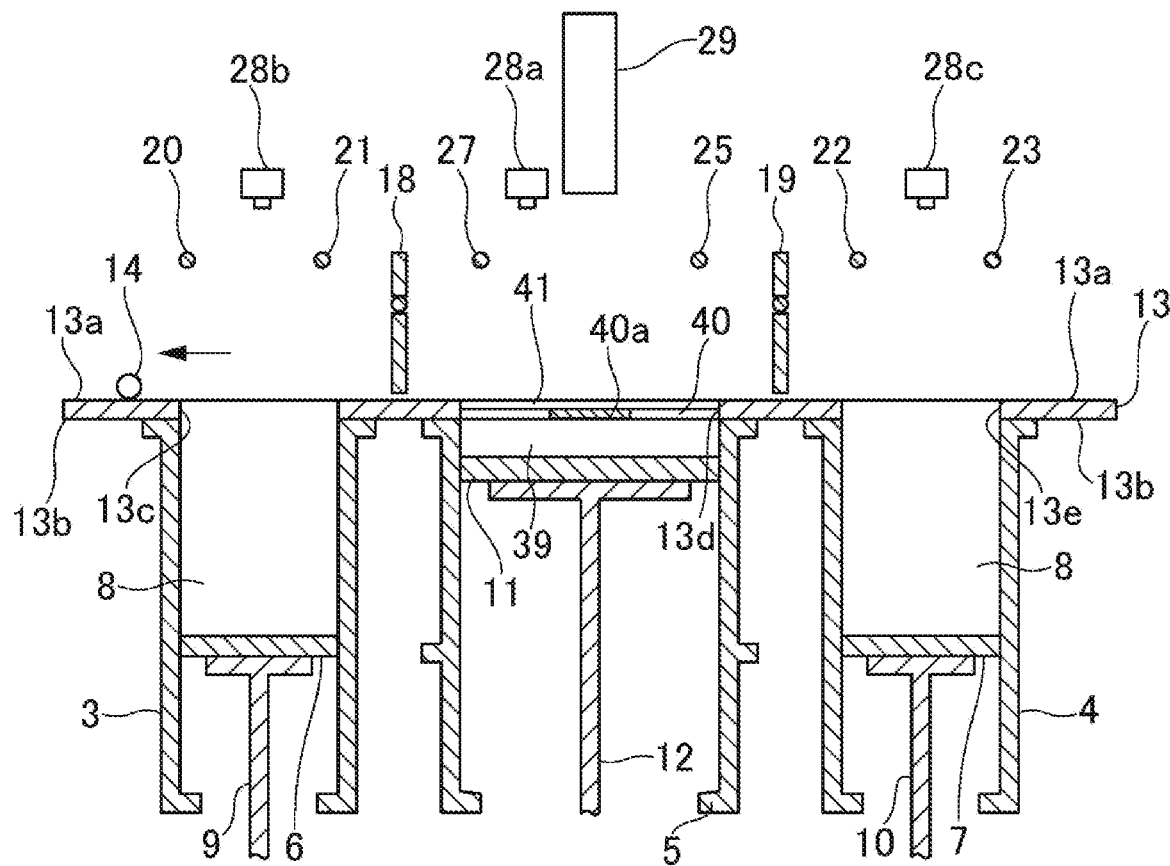
FIG. 25 is a cross-sectional view corresponding to FIG. 4, illustrating the model being fabricated.

As illustrated in FIG. 25, the control unit 34 further moves the recoater 14 leftward. This causes the recoater 14 to carry the powder material 8 left unused for the formation of the thin layer 41 into the storage container 3 via the upper surface 13a and the through-hole 13c.

In this way, the remaining powder material 8 is stored in the storage container 3.

The control unit 34 then stops the recoater 14 at a position to the left of the storage container 3. As a result, as mentioned earlier, if there is an excess powder material 8 that could not be put in the storage container 3, that excess powder material 8 is put in the reservoir container 3E.

Figure 26:
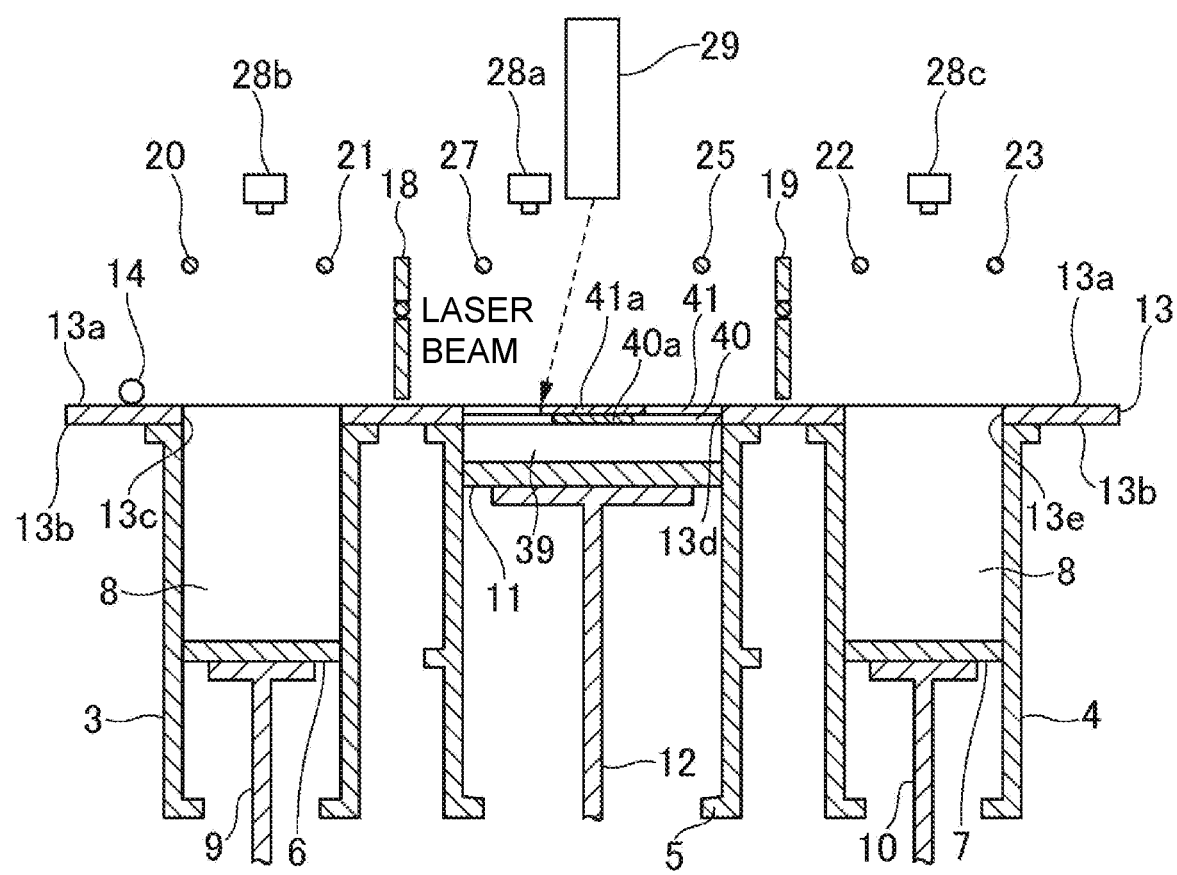
FIG. 26 is a cross-sectional view corresponding to FIG. 4, illustrating the model being fabricated.

Next, as illustrated in FIG. 26, the control unit 34 controls the laser beam emission unit 29 based on the piece of second-layer slice data $SD_2$ to emit and scan a laser beam over the region (modeling region) of the second thin layer 41 corresponding to the modeling region $ma_2$ in the piece of the slice data $SD_2$.

This is how the modeling region of the second thin layer 41 is irradiated with a laser beam. As a result, the powder material 8 in this modeling region is fused and then solidifies to form a second solidified layer 41a.

The control unit 34 then stops the emission and scan of the laser beam.

Thereafter, in the fabrication container 5, a third thin layer 42 and a third solidified layer 42a of the powder material 8 is formed on the second thin layer 41 and the second solidified layer 41a in the same manner as the formation of the first thin layer 40 and the first solidified layer 40a, and a fourth thin layer 43 and a fourth solidified layer 43a of the powder material 8 is further formed on the third thin layer 42 and the third solidified layer 42a in the same manner as the formation of the second thin layer 41 and the second solidified layer 41a.

Figure 27:
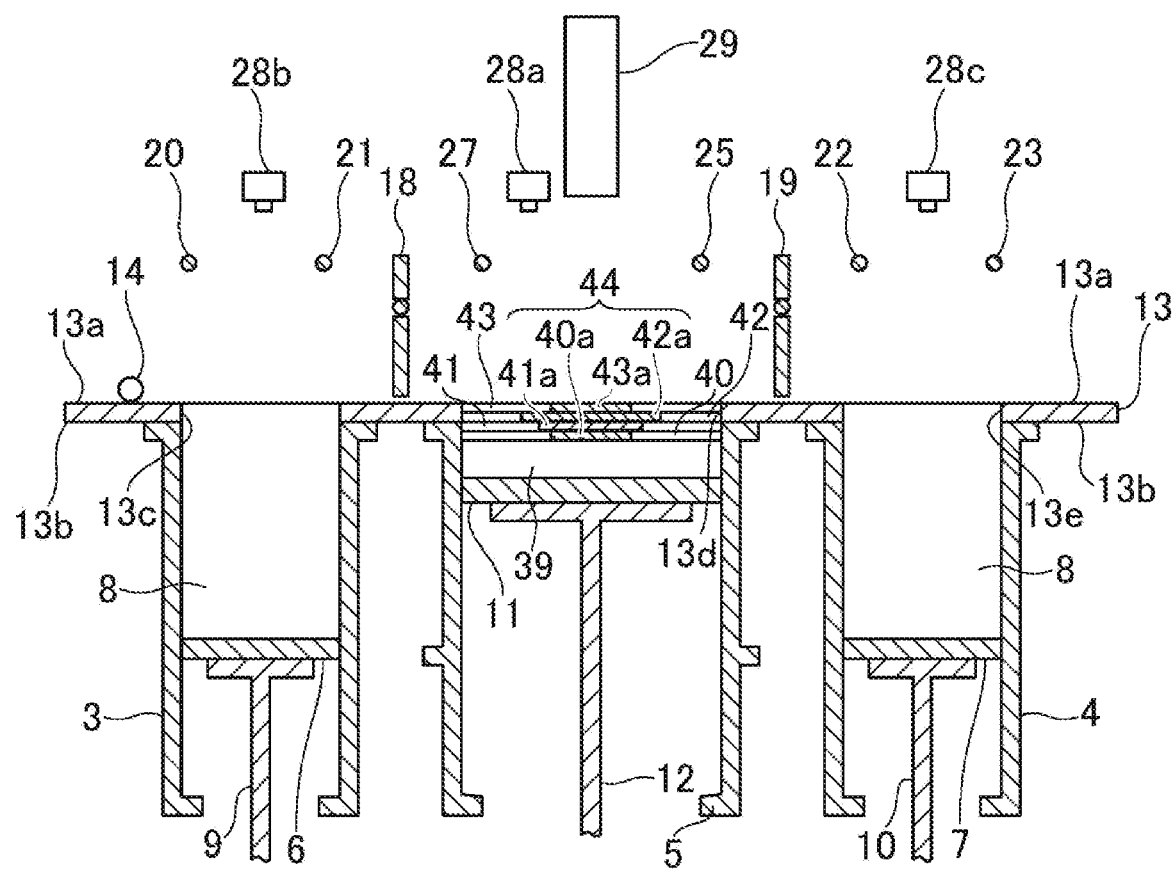
FIG. 27 is a cross-sectional view corresponding to FIG. 4, illustrating the model being fabricated.

By repeating formation of a thin layer of the powder material 8 and formation of a solidified layer in this thin layer as described above, the plurality of solidified layers 40a to 43a are laminated on the thin layer 39 in the fabrication container 5 as illustrated in FIG. 27, so that a three-dimensional model 44 is fabricated.

Figure 28:
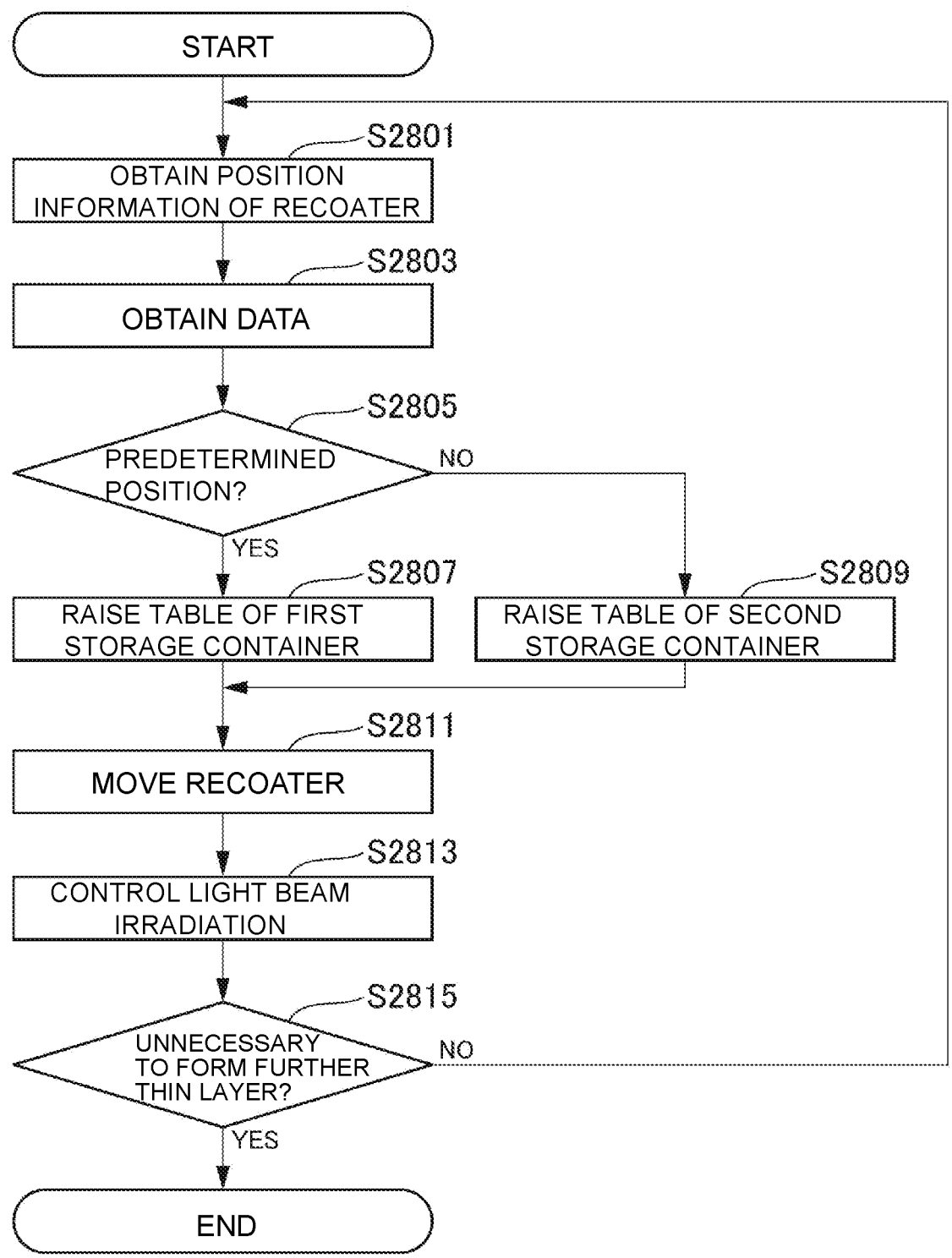
FIG. 28 is a flowchart illustrating a three-dimensional model fabrication process.

The process of fabricating the three-dimensional model 44 described above will be briefly described again based on the flowchart of FIG. 28.

In step S2801, the position information of the recoater 14 is obtained. The information obtaining unit 3411 performs this obtaining of the position information.

In step S2803, data on the model 44, e.g., slice data, is obtained. The data processing unit 3412a performs this obtaining.

In step S2805, it is determined whether the recoater 14 is at a predetermined position based on its position information obtained in step S2801. In the present embodiment, as illustrated in FIGS. 1 to 4, a position outside and to the left of the storage container 3 and the reservoir container 3E is defined as the predetermined position.

If it is determined in step S2805 that the recoater 14 is at the predetermined position (positive determination in step S2805), the table 6 of the storage container 3, which is a first storage container on the side closer to the predetermined position of the recoater 14, is raised in step S2807 so that the powder material 8 stored in the storage container 3 can be carried into the fabrication container 5. At this time, the tables 11 and 7 of the fabrication container 5 and the storage container 4, respectively, are lowered as described above.

If, on the other hand, it is determined in step S2805 that the recoater 14 is not at the predetermined position (negative determination in step S2805), the table 7 of the storage container 4, which is a second storage container on the side opposite to the predetermined position of the recoater 14, is raised in step S2809 so that the powder material 8 stored in the storage container 4 can be carried into the fabrication container 5. At this time, the tables 11 and 6 of the fabrication container 5 and the storage container 3, respectively, are lowered as described above. Note that the table control unit 3412b performs the processes of steps S2805 to S2809.

In step S2811, the recoater 14 is moved from the current position on one side of the fabrication container 5 toward the other side of the fabrication container 5. The recoater control unit 3412c performs this moving of the recoater 14.

In step S2813, when it is necessary to perform light beam irradiation according to the slice data of the model 44, the light beam irradiation is controlled as described above. The laser unit 3413, i.e., the irradiation control unit 3413a, performs this light beam irradiation control.

In step S2815, it is determined whether it is unnecessary to form a further thin layer. In other words, it is determined whether the model 44 has been completed. The data processing unit 3412a performs this.

If it is necessary to form a further thin layer (negative determination in step S2815), the process returns to step S2801. If, on the other hand, it is unnecessary to form a further thin layer (positive determination in step S2815), the process is terminated, and the model 44 is taken out.

Now, a case of carrying the powder material 8 stored in the storage container 3 into the fabrication container 5 will be described. Note that the following similarly applies to a case of carrying the powder material 8 stored in the storage container 4 into the fabrication container 5, and therefore duplicate description will be omitted below.

Figure 29:
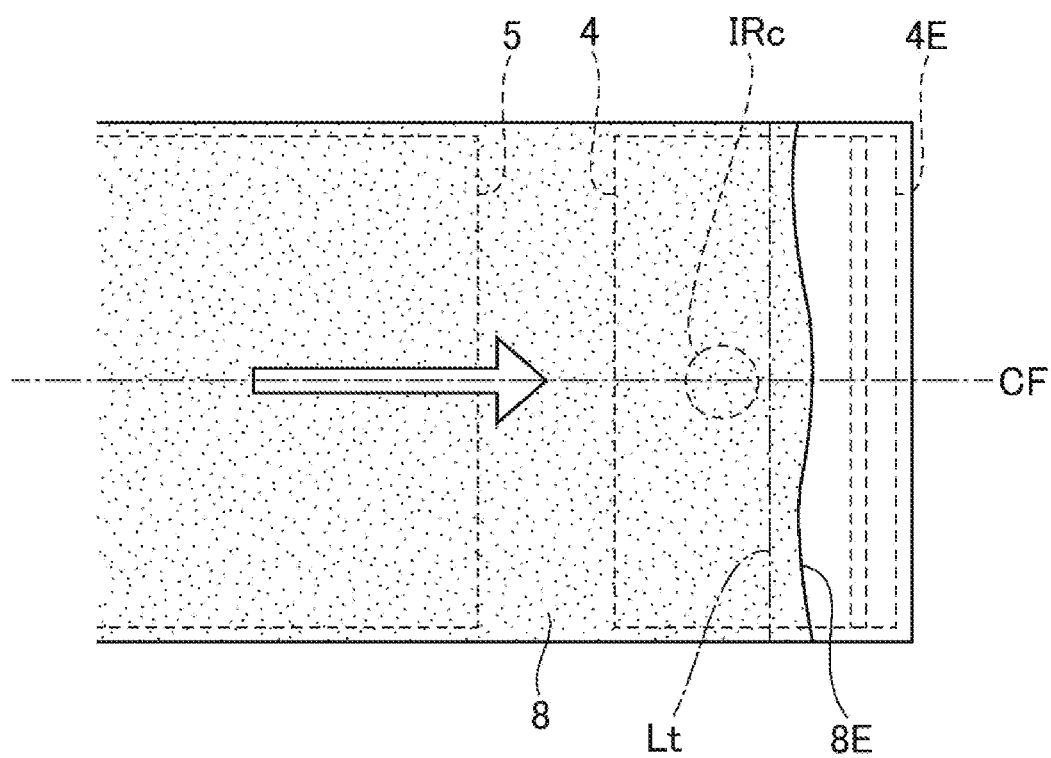
FIG. 29 is a view for describing an example of carrying of the powder material into a fabrication container.

FIG. 29 illustrates a schematic view of the top of the storage container 4 and parts around it in the case of carrying the powder material 8 stored in the storage container 3 into the fabrication container 5. The carrying direction of the powder material in FIG. 29 is the direction indicated by the arrow in FIG. 29.

A region IRc illustrated in FIG. 29 is a temperature measurement region on the surface of the powder material 8 in the storage container 4 for the temperature detection unit 28c. In the case of carrying the powder material 8 stored in the storage container 3 into the fabrication container 5, the amount of the powder material 8 to be carried is set at a predetermined amount α, which is a reference value, so that the powder material having passed the fabrication container 5 can reach a line Lt, as illustrated in FIG. 29. In the present embodiment, the predetermined amount α is constant, and the amount of rise of the supply table 6 of the storage container 3 is set so as to achieve this predetermined amount α. The line Lt extends outward of the region IRc, i.e., on the opposite side from the fabrication container 5, and perpendicularly crosses a plane CF extending through the centers of the containers 3 to 5. Thus, when the powder material 8 reaches the storage container 4 within an allowable limit of error, an edge 8E of the excess powder material 8 having passed the fabrication container 5 passes the region IRc and stops within the storage container 4.

At this time, the powder material 8 in the storage containers 3 and 4 is heated to the first predetermined temperature, and the powder material 8 in the fabrication container 5 is heated to the third predetermined temperature higher than the first predetermined temperature and also higher than the second predetermined temperature (first predetermined temperature<third predetermined temperature, second predetermined temperature<third predetermined temperature). Accordingly, by passing over the fabrication container 5, the powder material 8 is heated to a temperature higher than the first and second predetermined temperatures. Thus, when the powder material 8 reaches the storage container 4 within an allowable limit of error and the edge 8E of the excess powder material 8 having passed the fabrication container 5 passes the region IRc, the temperature of the powder material 8 in the storage container 4 detected by the temperature detection unit 28c has risen, and this temperature change exceeds a threshold value β.

Figure 30:
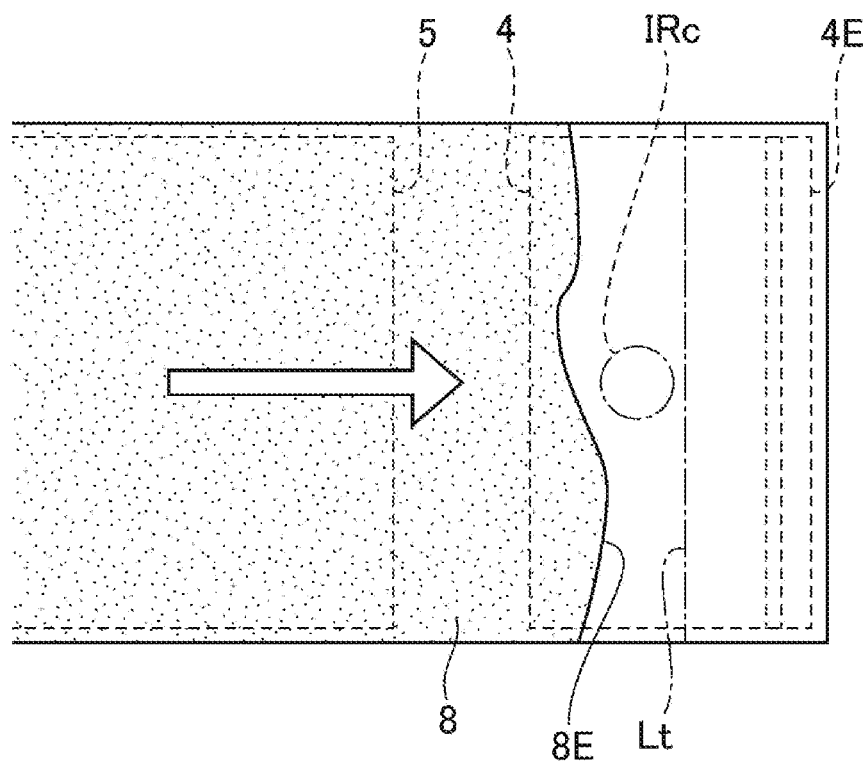
FIG. 30 is a view for describing another example of carrying of the powder material into the fabrication container.

On the other hand, in the case, for example, where light beam irradiation is performed and the amount of shrinkage of the portion irradiated with the laser beam is unexpectedly large or in other similar cases, that shrunk portion takes a large amount of the powder material 8. In such a case, after the powder material 8 stored in the storage container 3 is carried into the fabrication container 5, the edge 8E of the excess powder material 8 having passed the fabrication container 5 does not reach the region IRc, as illustrated in FIG. 30. In this state, the change in the temperature of the powder material 8 in the storage container 4 detected by the temperature detection unit 28c is less than or equal to the threshold value β. If such a situation continues, it increases the possibility of failing to supply a sufficient amount of the powder material 8 to the fabrication container 5.

Figure 31:
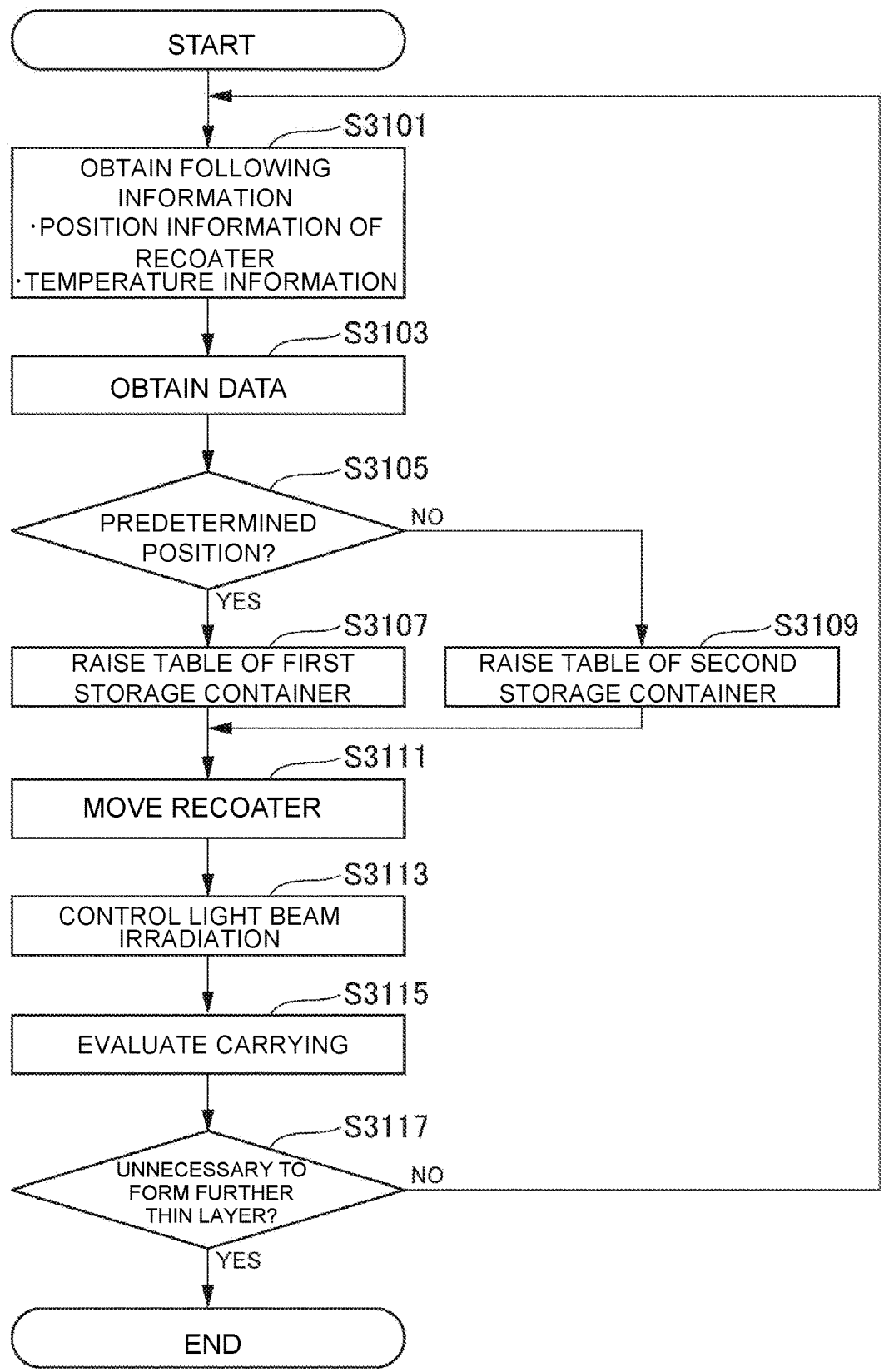
FIG. 31 is a flowchart illustrating a three-dimensional model fabrication process including a step characteristic to the embodiment.

To solve this, in the powder bed fusion apparatus 1, when the above-mentioned change in the temperature of the powder material 8 in the storage container 4 detected by the temperature detection unit 28c is less than or equal to the threshold value β, this state is evaluated or determined as a sign of abnormality, i.e., when the possibility of the abnormality has increased, and the sign of the abnormality, i.e., when the possibility of the abnormality has increased, is detected based on the temperature of the powder material stored in the storage container on the downstream side in the carrying direction of the powder material, in particular, based on the change in that temperature. If the sign of the abnormality, i.e., when the possibility of the abnormality has increased, is detected, then, when the recoater 14 is moved next in the reverse direction to convey the powder material 8 stored in the storage container 4 into the fabrication container 5, the amount of to be supplied, i.e., the amount to be carried, is increased from the predetermined amount α. A process of fabricating the three-dimensional model 44 including the above determination and increase will be described based on the flowchart of FIG. 31. Note that steps S3103 to S3113 and S3117 in the flowchart of FIG. 31 are the same as steps S2803 to S2815 in FIG. 28, respectively, and further description thereof will therefore be omitted.

In step S3101, the position information of the recoater 14 is obtained, and the temperature information, i.e., temperature, of the powder material 8 measured by each of the temperature detection units 28b and 28c is obtained, and the position information and the temperature information are stored in the storage unit 342.

Then, the obtaining of the data on the model 44 (S3103), the determination of the position of the recoater 14 (S3105), the powder material carrying process (S3107, S3109, S3111), and the light beam irradiation (S3113) are executed. In step S3115, the carrying of the powder material 8 as described above is evaluated, and the amount to be carried is increased if necessary. Then, if it is necessary to form a further thin layer (negative determination in step S3117), steps S3101 to S3115 are repeated.

Now, the evaluation of the carrying of the powder material 8 in step S3115 and so on will be described based on the flowchart of FIG. 32.

In the case of carrying the powder material 8 stored in the storage container 3 into the fabrication container 5, the storage container 4 is the destination storage container for the recoater 14. In this case, in step S3201, a temperature $T_{i-1}$ of the powder material 8 stored in the storage container 4 is obtained. This temperature $T_{i-1}$ obtained is the temperature of the powder material 8 stored in the storage container 4 obtained in step S3101 in FIG. 31 and, in the present embodiment, is obtained by reading that temperature stored in the storage unit 342.

In step S3203, when step S3115 is reached after the recoater 14 is moved in step S3111, a temperature $T_i$ of the powder material 8 stored in the storage container 4 at this time is detected. Then, based on the temperature $T_{i-1}$ obtained in step S3201 and the temperature $T_i$ obtained in step S3203, computation of Equation (2) below is performed to calculate a temperature change $\Delta T$, i.e., the value of Equation (2). In the present embodiment, Tsp is the second predetermined temperature and is equal to the first predetermined temperature. Also, MAX(Tsp, $T_{i-1}$) is the higher of the temperature Tsp and the temperature $T_{i-1}$. One reason to use the temperature Tsp in Equation (2) is to solve a problem where the temperature of the powder material 8 in the storage container 4 before moving the recoater is detected to be a value lower than the second predetermined temperature. MAX(Tsp, $T_{i-1}$) may be the temperature $T_{i-1}$ from the beginning.

$$\Delta T = T_i - \text{MAX}(Tsp, T_{i-1}) \tag{2}$$

In step S3207, the calculated temperature change $\Delta T$ and the threshold value $\beta$ (where $\beta > 0°$ C.) are compared with each other. In the present embodiment, it is determined whether the temperature change $\Delta T$ is more than the threshold value $\beta$, in other words, whether or not the temperature change $\Delta T$ is less than or equal to the threshold value $\beta$. Note that the temperature change $\Delta T$ to be compared with the threshold value $\beta$ may be its absolute value. If the temperature change $\Delta T$ is more than the threshold value $\beta$ (positive determination in step S3207), the amount of the powder material 8 to be carried is kept at the predetermined amount $\alpha$ in step S3209. The amount of the powder material 8 to be conveyed next from the storage container 4, which is on the upstream side in the conveyance direction of the powder material 8, i.e., the amount of rise of the supply table 7, is controlled based on the predetermined amount $\alpha$.

If the temperature change $\Delta T$ is not more than the threshold value $\beta$, that is, the temperature change $\Delta T$ is less than or equal to the threshold value $\beta$ (negative determination in step S3207), the amount of the powder material 8 to be conveyed is increased in step S3211. In the present embodiment, this increase is performed by adding a predetermined increase amount $\gamma$ to the predetermined amount $\alpha$ (where $\gamma > 0$). By this increase, the amount of the powder material 8 to be conveyed next from the storage container 4, which is on the upstream side in the conveyance direction of the powder material 8, i.e., the amount of rise of the supply table 7, in step S3109 in the next routine of the flowchart of FIG. 31, is controlled such that the amount to be carried will be equal to the sum of the predetermined amount $\alpha$ and the predetermined increase amount $\gamma$. As described above, with the apparatus 1, if an indication of abnormality is detected, the amount to be carried in the carrying process immediately after the detection is increased, and the amount to be carried in the carrying process following the one immediately after the detection of the indication of abnormality is returned to the predetermined amount being the reference value as long as no further indication of abnormality is detected. Note that the predetermined increase amount $\gamma$ may be constant or variable. For example, when the predetermined increase amount $\gamma$ is variable, it is preferably calculated according to the value of the temperature change $\Delta T$. The predetermined increase amount $\gamma$ is preferably set so as to eliminate a sign of a shortage of the powder material 8.

Figure 32:
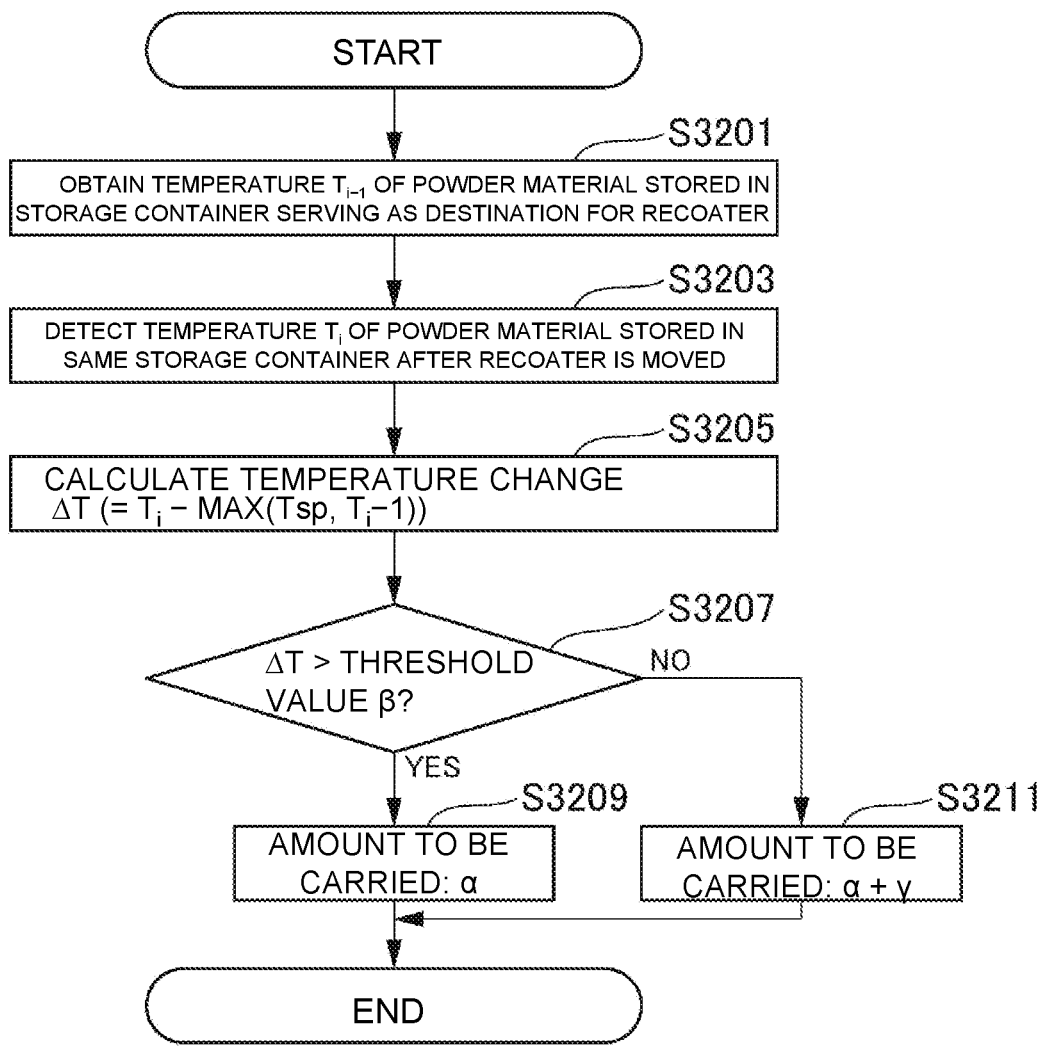
FIG. 32 is a flowchart of the carrying evaluation in the flowchart of FIG. 31.

This process based on the flowchart of FIG. 32 is similarly applied to when the powder material 8 in the storage container 4 is carried into the fabrication container 5. This involves: detecting the temperature of the powder material 8 stored in the storage container 3, which is the destination for the recoater 14, with the temperature detection unit 28b; comparing the change $\Delta T$ in this temperature before and after the movement of the recoater 14 with the threshold value $\beta$; evaluating the carrying of the powder material 8 into the fabrication container 5; and depending on the evaluation result, in particular, if the evaluation indicates a sign of a shortage of the powder material 8, increasing the amount of the powder material 8 in the storage container 3 to be carried next into the fabrication container 5. By this increase, the amount of the powder material 8 to be conveyed next from the storage container 3, which is on the upstream side in the conveyance direction of the powder material 8, i.e., the amount of rise of the supply table 6, in step S3107 in the next routine of the flowchart of FIG. 31, is controlled such that the amount to be carried will be equal to the sum of the predetermined amount $\alpha$ and the predetermined increase amount $\gamma$.

The powder bed fusion apparatus 1 with the above configuration achieves the following advantageous effects.

When the powder material is carried into the fabrication container 5, the temperature of the powder material 8 stored in the storage container 3 or 4 serving as the destination for the recoater 14 is detected, followed by comparing the change $\Delta T$ in the temperature of the powder material 8 stored in the storage container 3 or 4 serving as the destination for the recoater 14 before and after the movement of the recoater 14 with the threshold value $\beta$ as described above, and evaluating the carrying of the powder material 8. In this way, when the powder bed fusion apparatus 1 sequentially forms layers of the powder material 8 one over another to manufacture the model 44, a sign of abnormality in any of the layers can be precisely detected before that abnormality occurs.

Also, if a sign of abnormality is recognized based on the change in the temperature of the powder material 8 stored in the storage container 3 or 4 serving as the destination for the recoater 14, the amount of the powder material 8 to be carried by the recoater 14 when it returns to the other storage container 3 or 4 side is increased. This can fix and eliminate the detected sign of abnormality. In sum, when a sign of abnormality is recognized, the amount of the powder material to be carried is automatically adjusted to thereby fix and eliminate the detected sign of abnormality. Accordingly, the abnormality can be prevented from occurring.

In step S3207 described above, the temperature change $\Delta T$ and the threshold value $\beta$ are compared, and the carrying of the powder material 8 is evaluated. However, the carrying of the powder material can be evaluated in various ways based on the temperature detected by the temperature detection unit 28b or 28c. For example, the carrying of the powder material may be evaluated by comparing the detected temperature directly with a threshold value set according to this temperature. Also, the above apparatus 1 uses the same threshold value in step S3207 when carrying the powder material in the storage container 3 into the fabrication container 5 and when carrying the powder material in the storage container 4 into the fabrication container 5. However, different threshold values may be used, in which case they are preferably set according to characteristics of the apparatus 1. Further, the above apparatus 1 uses the same reference value for the amount to be carried when carrying the powder material in the storage container 3 into the fabrication container 5 and when carrying the powder material in the storage container 4 into the fabrication container 5. However, different reference values may be used, in which case they are preferably set according to characteristics of the apparatus 1. For example, in the present embodiment, the above apparatus 1 uses the same reference value for the amount to be carried in the case of detecting a sign of abnormality on the storage container 4 side when carrying the powder material in the storage container 3 into the fabrication container 5 and changing the amount to be carried based on that detection, and in the case of detecting a sign of abnormality on the storage container 3 side when carrying the powder material in the storage container 4 into the fabrication container 5 and changing the amount to be carried based on that detection. However, different reference values may be used, in which case they are preferably set according to characteristics of the apparatus 1. Note that the above apparatus 1 increases the amount to be carried by the same amount in the case of detecting a sign of abnormality on the storage container 4 side when carrying the powder material in the storage container 3 into the fabrication container 5 and in the case of detecting a sign of abnormality on the storage container 3 side when carrying the powder material in the storage container 4 into the fabrication container 5. However, different amounts of increase may be used, in which case they are preferably set according to characteristics of the apparatus 1.

Also, the above apparatus 1 evaluates the carrying of the powder material by the method described above, and changes the amount of the powder material to be carried next depending on the result of the evaluation. However, the present disclosure is not limited to evaluating the carrying of the powder material by the method described above and changing the amount of the powder material to be carried next depending on the result of the evaluation. For example, the carrying of the powder material may simply be evaluated. In this case, the result of the evaluation does not necessarily have to be used in the next control or the like. Alternatively, if a sign of abnormality such as a shortage of the powder material is recognized as a result of evaluating the carrying of the powder material, a warning device or the like may be actuated.

Further, the above apparatus 1 evaluates the carrying of the powder material by the method described above, and changes the amount of the powder material to be carried next depending on the result of the evaluation. However, the amount to be carried that is to be changed may be an amount(s) to be carried other than the amount of the powder material to be carried immediately after the evaluated carrying of the powder material. For example, the timing to increase the amount of the powder material to be carried is not limited to the next carrying of the powder material from the storage container 4 to the storage container 3 following the carrying of the powder material from the storage container 3 to the storage container 4, and may be the next carrying of the powder material from the storage container 3 to the storage container 4 following the carrying of the powder material from the storage container 3 to the storage container 4.

Figure 33A:
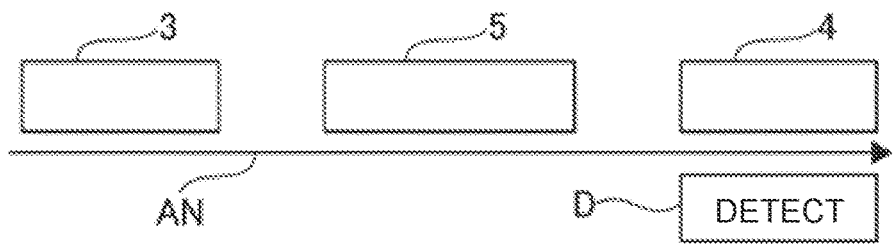
FIGS. 33A to 33E are diagrams illustrating variations of how to increase the amount of the powder material to be carried.
Figure 33B:

Based on FIGS. 33A to 33E, a further description will be given of a case where it is determined in the evaluation of the carrying of the powder material (step S3207) that the temperature change ΔT is not more than the threshold value β, that is, the temperature change ΔT is less than or equal to the threshold value β (negative determination in step S3207). FIG. 33A illustrates an assumed condition common to variations of how to increase the amount to be carried in FIGS. 33B to 33E. Reference sign "AN" denotes an arrow representing a carrying process in the above apparatus 1 for moving the recoater 14 from the storage container 3 side to the storage container 4 side to carry the powder material 8 into the fabrication container 5 and thereby form the N-th layer in the fabrication container 5. Reference sign "D" denotes detection of an indication of abnormality as a result of determining that the temperature change ΔT regarding the storage container 4 serving as the destination for the recoater 14 in this process is less than or equal to the threshold value β. Reference sign "AN+1" denotes an arrow representing the carrying process in the above apparatus 1 for moving the recoater 14 from the storage container 4 side to the storage container 3 side immediately after the detection D of the indication of abnormality to carry the powder material 8 into the fabrication container 5 and thereby form the (N+1)-th layer directly on the N-th layer. Since the amount of the powder material carried in the carrying process represented by the "AN+1" arrow is larger by γ than the amount α of the powder material carried in the carrying process represented by the "AN" arrow, the "AN+1" arrow is thicker than the "AN" arrow (see FIG. 33B).

Alternatively, in the carrying process for moving the recoater 14 from the storage container 4 side to the storage container 3 side immediately after the detection D of the indication of abnormality to carry the powder material 8 into the fabrication container 5 and thereby form the (N+1)-th layer in the fabrication container 5 ("AN+1" arrow), the amount to be carried may be kept from being increased. In the next carrying process for moving the recoater 14 from the storage container 3 side to the storage container 4 side to carry the powder material 8 into the fabrication container 5 and thereby form the (N+2)-th layer directly on the (N+1)-th layer ("AN+2" arrow), the amount of the powder material to be carried may be set to be larger by γ than the amount of the powder material carried in each of the carrying process represented by the "AN" arrow and the carrying process represented by the "AN+1" arrow (see FIG. 33C).

Still alternatively, in the carrying process for moving the recoater 14 from the storage container 4 side to the storage container 3 side immediately after the detection D of the indication of abnormality to carry the powder material 8 into the fabrication container 5 and thereby form the (N+1)-th layer in the fabrication container 5 ("AN+1" arrow), the amount to be carried may be increased. In addition to this, in the next carrying process for moving the recoater 14 from the storage container 3 side to the storage container 4 side to carry the powder material 8 into the fabrication container 5 and thereby form the (N+2)-th layer in the fabrication container 5 ("AN+2" arrow), the amount of the powder material to be carried may be increased as well (see FIG. 33D).

Figure 33C:
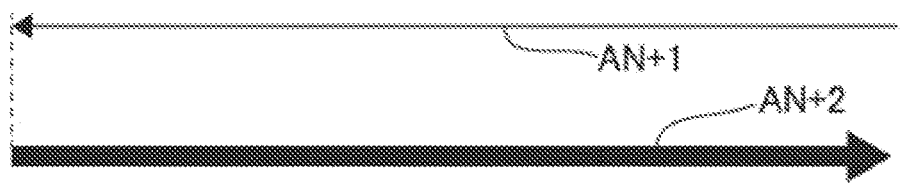
Figure 33D:
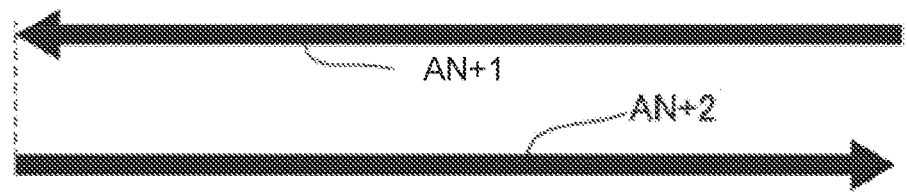
Figure 33E:
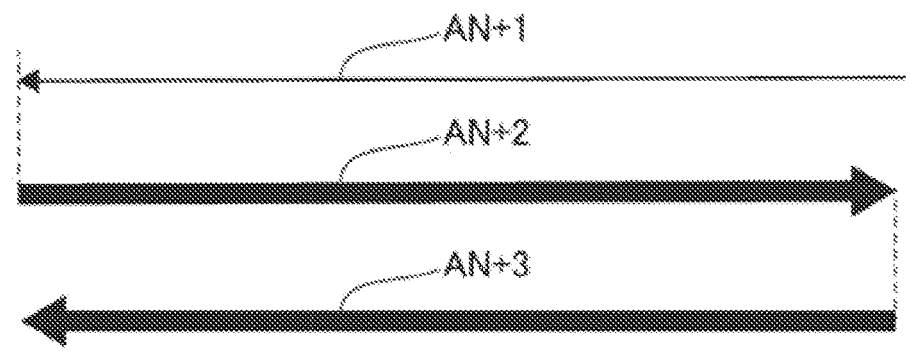

Yet alternatively, the amount to be carried can be increased as illustrated in FIG. 33E, which is a combination of FIGS. 33C and 33D. In the next carrying process for moving the recoater 14 from the storage container 4 side to the storage container 3 side following the detection D of the indication of abnormality to carry the powder material 8 into the fabrication container 5 and thereby form the (N+1)-th layer in the fabrication container 5 ("AN+1" arrow), the amount to be carried may be kept from being increased. In the next carrying process for moving the recoater 14 from the storage container 3 side to the storage container 4 side to carry the powder material 8 into the fabrication container 5 and thereby form the (N+2)-th layer in the fabrication container 5 ("AN+2" arrow), and also in the further next carrying process ("AN+3" arrow), the amount of the powder material to be carried may be set to be larger than the amount of the powder material carried in each of the carrying process represented by the "AN" arrow and the carrying process represented by the "AN+1" arrow (see FIG. 33E).

By increasing the amount of the powder material to be carried with any of the timings illustrated in FIGS. 33C to 33E, the amount to be carried is increased when the recoater 14 is moved to the storage container 4 side, on which the detection D of the indication of abnormality occurred. Thus, at the storage container 4, at which the detection D of the indication of abnormality occurred, whether there is still the indication of abnormality is determined and evaluated again. This makes it possible to reliably check whether the indication of abnormality has been eliminated. Also, by increasing the amount to be carried in at least two given carrying processes by which the recoater 14 makes a round trip per detection of an indication of abnormality (see FIGS. 33D and 33E), the error in the amount to be carried due to the individual difference of the apparatus 1 or the like, and so on can be more reliably made negligible. This makes it possible to more reliably eliminate the indication of abnormality.

Note that the above description based on FIGS. 33A to 33E is about a case where an indication of abnormality is detected at the storage container 4 when the recoater 14 is moved from the storage container 3 side to the storage container 4 side. However, the description also applies to a case where an indication of abnormality is detected at the storage container 3 when the recoater 14 is moved from the storage container 4 side to the storage container 3 side. Also, if indications of abnormality are successively detected at both storage containers 3 and 4, the amount to be carried may be increased as described above in a plurality of corresponding carrying processes. It is to be noted that the detection of an indication of abnormality is followed by increasing the amount to be carried in the corresponding one or more carrying processes, but the amount to be carried in the carrying processes following these one or more carrying processes will be returned to the predetermined value being the reference value as long as no further indication of abnormality is detected.

Figure 34:
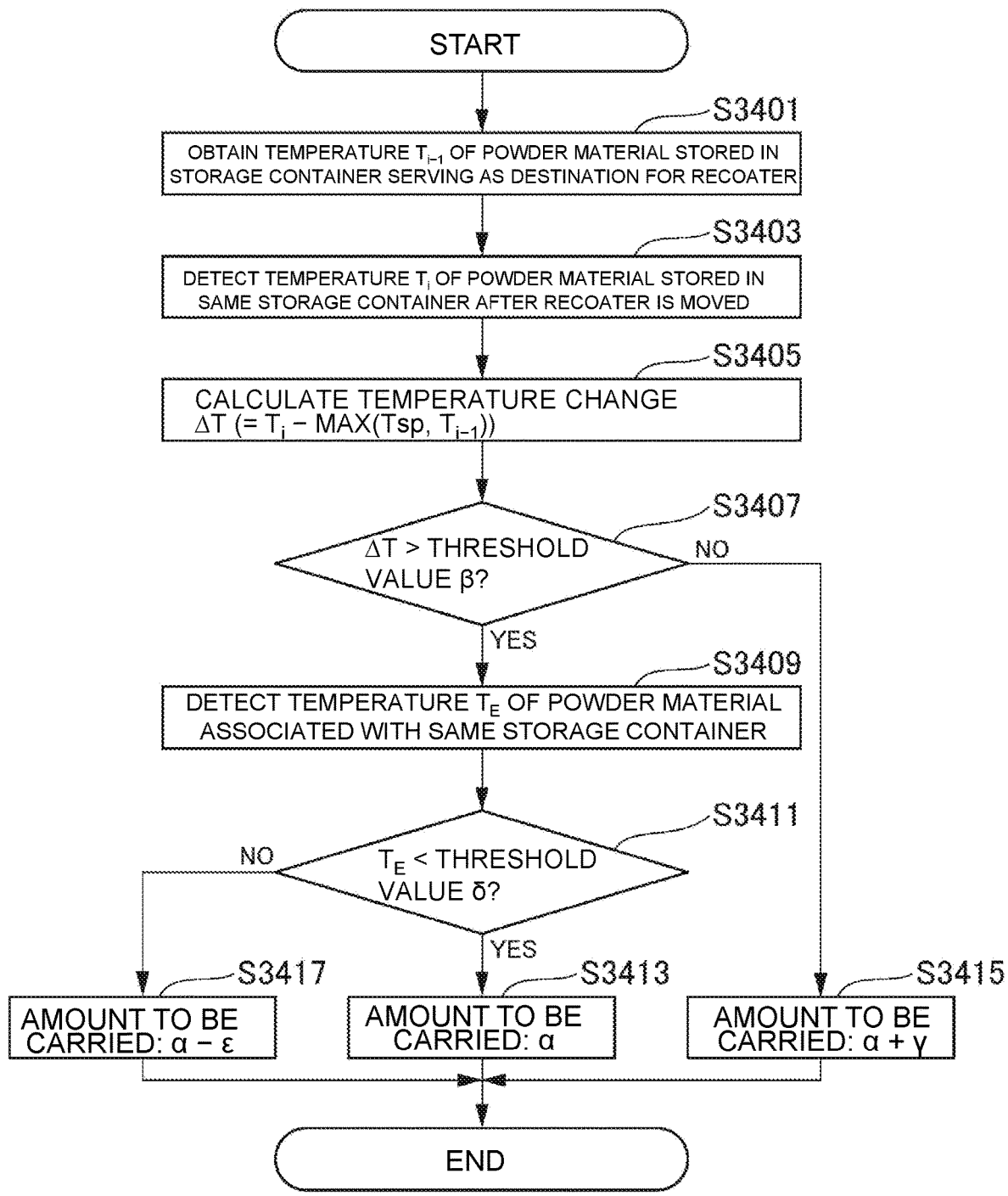
FIG. 34 is a flowchart of carrying evaluation by a powder bed fusion apparatus according to a modification.

Incidentally, in order to prevent entry of an excess powder material 8 into the reservoir containers 3E and 4E, the powder bed fusion apparatus 1 may be provided with further temperature detection units 28d and 28e and perform further control with them. As illustrated with the broken lines in FIG. 1, for example, the further temperature detection units 28d and 28e are each disposed so as to measure the temperature of the powder material 8 on an outer side in the storage container 3 or 4, i.e., the reservoir container 3E or 4E side. Note that the temperature detection units 28d and 28e may each be provided so as to measure the temperature of the powder material in the reservoir container 3E or 4E. The temperature detection units 28d and 28e are contact temperature detection devices but may be non-contact temperature detection devices, like the temperature detection units 28a to 28c. With the above configuration, it is preferable to perform control based on the flowchart of FIG. 34. Steps S3401 to S3407, S3413, and S3415 in FIG. 34 correspond to steps S3201 to S3211 in FIG. 32, respectively, and duplicate description thereof will therefore be omitted.

If the temperature change $\Delta T$ is more than the threshold value $\beta$ in step S3407 (positive determination in step S3407), then, in step S3409, the temperature detection unit 28d or 28e detects a temperature $T_E$ of the powder material 8 associated with the storage container 3 or 4 serving as the destination for the recoater 14. Moreover, whether the detected temperature $T_E$ is less than a threshold value $\delta$ (where $\delta>0°$ C.) is determined. The threshold value $\delta$ is set as a temperature with which, when the destination storage container for the recoater 14 is, for example, the storage container 4, it is possible to detect that the powder material 8 has reached the outer end of the storage container 4 on the reservoir container 4E side. If the detected temperature $T_E$ is less than the threshold value $\delta$ (positive determination in step S3411), the amount of the powder material 8 to be conveyed, i.e., carried, is kept at the predetermined amount $\alpha$ in step S3413.

On the other hand, if the detected temperature $T_E$ is more than or equal to the threshold value $\delta$ (negative determination in step S3411), the amount to be carried is reduced in step S3417. In the present embodiment, this reduction is performed by subtracting a predetermined reduction amount $\varepsilon$ (where $\varepsilon>0$) from the predetermined amount $\alpha$. The amount of the powder material 8 to be conveyed next from the storage container 4, which is on the upstream side in the conveyance direction, i.e., the amount of rise of the supply table 7, is controlled such that the amount to be carried will be equal to the amount obtained by subtracting the predetermined reduction amount $\varepsilon$ from the predetermined amount $\alpha$. Note that the predetermined reduction amount $\varepsilon$ may be constant or variable. For example, when the predetermined reduction amount $\varepsilon$ is variable, it is preferably calculated according to the value of the temperature $T_E$.

If $\Delta T$ is less than or equal to the threshold value $\beta$ in step S3407 (negative determination in step S3407), the amount to be carried is increased as described above in step S3415.

While an embodiment according to the present disclosure and a modification thereof have been described above, the present disclosure is not limited to these. Various replacements and changes can be made without departing from the spirit and scope of the present disclosure defined by the claims of the present application. The above embodiment and modification and the like are not limited to the above, and various combinations and the like can be made in a non-contradictory manner. Accordingly, the foregoing description is intended to be illustrative rather than restrictive.

The powder bed fusion apparatus 1 in the above embodiment detects the temperature of the powder material 8 stored in the storage container 3 or 4, evaluates how far the powder material 8 has moved based on this temperature, and if determining that an indication or sign of abnormality is recognized, increases the amount of the powder material 8 to be supplied, i.e., carried, when the recoater 14 returns to the opposite side. This enables optimization of the amount of the powder to be conveyed with a non-contact temperature detection unit, i.e., a non-contact temperature sensor. While the above determination is made based on a simple comparison between the temperature change $\Delta T$ and the threshold value $\beta$, a plurality of threshold values may be used to specifically determine the position of the powder material 8 having reached the storage container 3 or 4. In this case, the temperature detection units 28b and 28c may each include a plurality of temperature detection units for a plurality of positions in the corresponding storage container 3 or 4, and the temperatures, i.e., temperature changes, detected by these temperature detection units may be compared with respective threshold values. In this case too, the present disclosure is not limited to comparing the value of each temperature change with the corresponding threshold value. For example, each detected temperature may be directly compared with a corresponding temperature as described above.

The invention claimed is:
1. A powder bed fusion apparatus comprising:
   a first storage container that includes a first table disposed so as to be capable of being raised and lowered, and heats a powder material stored on the first table to a first predetermined temperature;
   a second storage container that includes a second table disposed so as to be capable of being raised and lowered, and heats the powder material stored on the second table to a second predetermined temperature;

a fabrication container that is provided between the first storage container and the second storage container, includes a modeling table which is disposed so as to be capable of being raised and lowered and on which a model is to be fabricated using the powder material, heats the powder material on the modeling table to a third predetermined temperature different from the first predetermined temperature and also different from the second predetermined temperature, and lets the powder material on the modeling table be irradiated with a laser beam from a laser beam emission unit based on the model to be fabricated;

a recoater that is provided so as to be capable of moving over the first storage container and over the second storage container to carry the powder material;

a carrying control unit that controls raising and lowering of each of the first table, the second table, and the modeling table and movement of the recoater when the powder material is carried into the fabrication container;

a first temperature measurement device that is provided so as to detect a temperature of the powder material stored in the second storage container; and an evaluation unit that, when the powder material in the first storage container is carried into the fabrication container, evaluates the carrying of the powder material based on the temperature of the powder material stored in the second storage container detected by the first temperature measurement device.

2. The powder bed fusion apparatus according to claim 1, wherein the first predetermined temperature is a temperature lower than the third predetermined temperature, and the second predetermined temperature is a temperature lower than the third predetermined temperature.

3. The powder bed fusion apparatus according to claim 1, wherein the first temperature measurement device is a non-contact temperature measurement device.

4. The powder bed fusion apparatus according to claim 1, further comprising an amount calculation unit that changes an amount of the powder material to be carried into the fabrication container based on a comparison between the temperature of the powder material stored in the second storage container detected by the first temperature measurement device and a threshold value by the evaluation unit.

5. The powder bed fusion apparatus according to claim 4, wherein when the evaluation unit indicates that a change in the temperature of the powder material stored in the second storage container is less than or equal to a first threshold value, the amount calculation unit increases an amount of the powder material to be carried into the fabrication container by moving the recoater from the second storage container side to the first storage container side or an amount of the powder material to be carried into the fabrication container by moving the recoater from the first storage container side to the second storage container side by a first predetermined amount from a first reference value.

6. The powder bed fusion apparatus according to claim 4, further comprising a second temperature measurement device that is provided so as to detect a temperature of the powder material stored in the first storage container, wherein when the powder material in the second storage container is carried into the fabrication container, the evaluation unit evaluates the carrying of the powder material based on a comparison between a change in the temperature of the powder material stored in the first storage container detected by the second temperature measurement device and a second threshold value, and when the evaluation unit indicates that the change in the temperature of the powder material stored in the first storage container is less than or equal to the second threshold value, the amount calculation unit increases an amount of the powder material to be carried into the fabrication container by moving the recoater from the first storage container side to the second storage container side or an amount of the powder material to be carried into the fabrication container by moving the recoater from the second storage container side to the first storage container side by a second predetermined amount from a second reference value.

7. A method of evaluating carrying of the powder material in the powder bed fusion apparatus according to claim 1, the method of evaluating carrying of the powder material comprising:

detecting the temperature of the powder material stored in the second storage container by using the first temperature measurement device when the recoater moves from the first storage container side toward the second storage container side to carry the powder material in the first storage container into the fabrication container; and evaluating the carrying of the powder material into the fabrication container based on a comparison between the detected temperature and a threshold value.

* * * * *